United States Patent
Meler

(10) Patent No.: US 9,792,709 B1
(45) Date of Patent: Oct. 17, 2017

(54) APPARATUS AND METHODS FOR IMAGE ALIGNMENT

(71) Applicant: GOPRO, INC., San Mateo, CA (US)

(72) Inventor: Antoine Meler, Chapareillan (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/949,786

(22) Filed: Nov. 23, 2015

(51) Int. Cl.
*G06T 11/60* (2006.01)
*G06T 3/00* (2006.01)
*H04N 5/232* (2006.01)

(52) U.S. Cl.
CPC ............ *G06T 11/60* (2013.01); *G06T 3/0018* (2013.01); *H04N 5/23238* (2013.01)

(58) Field of Classification Search
CPC .... G06T 3/0018; G06T 11/60; H04N 5/23238
See application file for complete search history.

(56) References Cited

U.S. PATENT DOCUMENTS

| | | | |
|---|---|---|---|
| 5,260,779 | A | 11/1993 | Wasserman |
| 5,555,895 | A | 9/1996 | Ulmer |
| 6,434,265 | B1 * | 8/2002 | Xiong ...................... G06K 9/32 382/154 |
| 6,486,908 | B1 * | 11/2002 | Chen ..................... G06T 3/0018 345/441 |
| 6,710,740 | B2 | 3/2004 | Needham |
| 6,711,293 | B1 | 3/2004 | Lowe |
| 6,788,333 | B1 | 9/2004 | Uyttendaele |

(Continued)

FOREIGN PATENT DOCUMENTS

| | | |
|---|---|---|
| EP | 0605045 A1 | 7/1994 |
| EP | 0650299 A1 | 4/1995 |

(Continued)

OTHER PUBLICATIONS

K. Perazzi, F., Sorkine-Hornung, A., Zimmer, H., Kaufmann, P., Wang, O., Watson, S., & Gross, M. (May 2015). Panoramic Video from Unstructured Camera Arrays. In Computer Graphics Forum (vol. 34, No. 2, pp. 57-68).

(Continued)

*Primary Examiner* — Jeffery A Brier
(74) *Attorney, Agent, or Firm* — Sheppard Mullin Richter & Hampton LLP

(57) ABSTRACT

Multiple images may be combined to obtain a composite image. Individual images may be obtained with different camera sensors and/or at different time instances. In order to obtain the composite image source images may be aligned in order to produce a seamless stitch. Source images may be characterized by a region of overlap. A disparity measure may be determined for pixels along a border region between the source images. A warp transformation may be determined using an optimizing process configured to determine displacement of pixels of the border region based on the disparity. Pixel displacement at a given location may be constrained to direction configured tangential to an epipolar line corresponding to the location. The warp transformation may be propagated to pixels of the image. Spatial and/or temporal smoothing may be applied. In order to obtain optimized solution, the warp transformation may be determined at multiple spatial scales.

20 Claims, 15 Drawing Sheets

(56) References Cited

U.S. PATENT DOCUMENTS

| | | |
|---|---|---|
| 7,057,663 B1 | 6/2006 | Lee |
| 7,403,224 B2 | 7/2008 | Fuller |
| 7,983,502 B2 | 7/2011 | Cohen |
| 8,411,166 B2 | 4/2013 | Miyata |
| 8,606,073 B2 | 12/2013 | Woodman |
| 8,670,030 B2 | 3/2014 | Tanaka |
| 8,842,197 B2 | 9/2014 | Singh |
| 8,890,954 B2 | 11/2014 | O'Donnell |
| 8,896,694 B2 | 11/2014 | O'Donnell |
| 9,019,396 B2 | 4/2015 | Kiyoshige |
| 9,158,304 B2 | 10/2015 | Fleck |
| 9,342,534 B2 | 5/2016 | Singh |
| 9,409,646 B2 | 8/2016 | Fleck |
| 9,473,758 B1 | 10/2016 | Long |
| 9,602,795 B1 | 3/2017 | Matias |
| 2002/0112005 A1 | 8/2002 | Namias |
| 2002/0122113 A1* | 9/2002 | Foote ............ G06T 3/4038 348/48 |
| 2002/0191087 A1 | 12/2002 | Hashimoto |
| 2003/0085992 A1 | 5/2003 | Arpa |
| 2003/0098954 A1 | 5/2003 | Amir |
| 2003/0160862 A1 | 8/2003 | Charlier |
| 2004/0010804 A1 | 1/2004 | Hendricks |
| 2004/0021780 A1 | 2/2004 | Kogan |
| 2004/0047606 A1 | 3/2004 | Mikawa |
| 2004/0075738 A1 | 4/2004 | Burke |
| 2004/0135900 A1 | 7/2004 | Pyle |
| 2004/0169724 A1 | 9/2004 | Ekpar |
| 2005/0033760 A1 | 2/2005 | Fuller |
| 2005/0062869 A1 | 3/2005 | Zimmermann |
| 2005/0104976 A1 | 5/2005 | Currans |
| 2005/0134707 A1 | 6/2005 | Perotti |
| 2005/0289111 A1 | 12/2005 | Tribble |
| 2006/0050997 A1 | 3/2006 | Imamura |
| 2007/0030358 A1 | 2/2007 | Aoyama |
| 2007/0053659 A1 | 3/2007 | Kiyama |
| 2007/0120986 A1 | 5/2007 | Nunomaki |
| 2007/0140662 A1 | 6/2007 | Nunomaki |
| 2007/0300249 A1 | 12/2007 | Smith |
| 2008/0094499 A1 | 4/2008 | Ueno |
| 2008/0118100 A1 | 5/2008 | Hayashi |
| 2009/0210707 A1 | 8/2009 | De Lutiis |
| 2009/0251558 A1 | 10/2009 | Park |
| 2009/0262206 A1 | 10/2009 | Park |
| 2009/0271447 A1 | 10/2009 | Shin |
| 2010/0045773 A1 | 2/2010 | Ritchey |
| 2010/0097443 A1* | 4/2010 | Lablans ............ G03B 37/00 348/36 |
| 2010/0238304 A1 | 9/2010 | Miyata |
| 2010/0250022 A1 | 9/2010 | Hines |
| 2010/0289924 A1 | 11/2010 | Koshikawa |
| 2010/0299630 A1 | 11/2010 | McCutchen |
| 2011/0013778 A1 | 1/2011 | Takumai |
| 2011/0115883 A1 | 5/2011 | Kellerman |
| 2011/0141300 A1* | 6/2011 | Stec ............ G06T 3/4038 348/222.1 |
| 2011/0261227 A1 | 10/2011 | Higaki |
| 2012/0206565 A1 | 8/2012 | Villmer |
| 2012/0242798 A1 | 9/2012 | Mcardle |
| 2013/0021450 A1 | 1/2013 | Yoshizawa |
| 2013/0058532 A1 | 3/2013 | White |
| 2013/0058619 A1 | 3/2013 | Miyakawa |
| 2013/0127903 A1* | 5/2013 | Paris ............ G06T 11/60 345/629 |
| 2013/0176403 A1 | 7/2013 | Varga |
| 2013/0177168 A1 | 7/2013 | Inha |
| 2013/0182177 A1 | 7/2013 | Furlan |
| 2013/0210563 A1 | 8/2013 | Hollinger |
| 2013/0235226 A1 | 9/2013 | Karn |
| 2014/0037268 A1 | 2/2014 | Shoji |
| 2014/0039884 A1 | 2/2014 | Chen |
| 2014/0240122 A1 | 8/2014 | Roberts |
| 2015/0055937 A1* | 2/2015 | Van Hoff ............ H04N 13/0014 386/285 |
| 2015/0058102 A1* | 2/2015 | Christensen ............ G11B 27/11 705/14.6 |
| 2015/0142211 A1 | 5/2015 | Shehata |
| 2015/0142742 A1 | 5/2015 | Hong |
| 2015/0166476 A1 | 6/2015 | Chen |
| 2015/0186073 A1 | 7/2015 | Pacurariu |
| 2015/0189221 A1 | 7/2015 | Nakase |
| 2015/0287435 A1 | 10/2015 | Land |
| 2015/0288754 A1 | 10/2015 | Mosko |
| 2015/0304532 A1 | 10/2015 | Bart |
| 2015/0336015 A1 | 11/2015 | Blum |
| 2015/0350614 A1 | 12/2015 | Meier |
| 2015/0363648 A1 | 12/2015 | Li |
| 2015/0367958 A1 | 12/2015 | Lapstun |
| 2015/0370250 A1 | 12/2015 | Bachrach |
| 2016/0005435 A1 | 1/2016 | Campbell |
| 2016/0018822 A1 | 1/2016 | Nevdahs |
| 2016/0031559 A1 | 2/2016 | Zang |
| 2016/0054737 A1 | 2/2016 | Soll |
| 2016/0076892 A1 | 3/2016 | Zhou |
| 2016/0098469 A1 | 4/2016 | Allinson |
| 2016/0101856 A1 | 4/2016 | Kohstall |
| 2016/0112713 A1 | 4/2016 | Russell |
| 2016/0129999 A1 | 5/2016 | Mays |
| 2016/0139596 A1 | 5/2016 | Na |
| 2016/0139602 A1 | 5/2016 | Kohstall |
| 2016/0165563 A1 | 6/2016 | Jang |
| 2016/0179096 A1 | 6/2016 | Bradlow |
| 2016/0189101 A1 | 6/2016 | Kantor |
| 2016/0234438 A1 | 8/2016 | Satoh |
| 2016/0239340 A1 | 8/2016 | Chauvet |
| 2016/0269621 A1 | 9/2016 | Cho |
| 2016/0295108 A1 | 10/2016 | Cao |
| 2016/0304198 A1 | 10/2016 | Jourdan |
| 2016/0306351 A1 | 10/2016 | Fisher |
| 2016/0313734 A1 | 10/2016 | Enke |
| 2016/0327950 A1 | 11/2016 | Bachrach |
| 2016/0336020 A1 | 11/2016 | Bradlow |
| 2016/0366290 A1 | 12/2016 | Hoshino |

FOREIGN PATENT DOCUMENTS

| | | |
|---|---|---|
| EP | 0661672 A1 | 7/1995 |
| WO | 2009047572 A1 | 4/2009 |
| WO | 2014090277 A1 | 6/2014 |

OTHER PUBLICATIONS

Qi Zhi, Q., & Cooperstock, Jeremy R. Toward Dynamic Image Mosaic Generation With Robustness to Parallax. Image Processing, IEEE Transactions on, 21(1), 366-378, (2012).

Farin et al., "Shortest Circular Paths on Planar Graphs," In 27th Symposium on Information Theory in the Benelux 2006, 8 pgs.

Zhi et al., "Toward Dynamic Image Mosaic Generation With Robustness to Parallax," IEEE Transactions on Image Processing, vol. 21, No. 1, Jan. 2012, pp. 366-378.

Perazzi et al., "Panoramic Video from Unstructured Camera Arrays," Eurographics, vol. 34 (2015), No. 2, 12pgs.

Mai Zheng et al: "Stitching Video from Webcams", Dec. 1, 2008 (Dec. 1, 2008), Advances in Visual Computing: 4th International Symposium, ISVC 2008, Las Vegas, NV, USA, Dec. 1-3, 2008. Proceedings, Part II, Springer Berlin Heidelberg, Berlin, Heidelberg, p. 420-429, XP019112243, ISBN: 978-3-540-89645-6 le document en entier.

Ryan Jackson: 'Shooting 360-degree video with four GoPro HD Hero cameras/Ryan Jackson Photography' 8 fvrier 2011 (Feb. 8, 2011), XP055099926, Extrait de l'Internet: URL:http://punkoryan.com/2011/02/08/shooting-360-degree-video-with-four-gopro-hd-hero-cameras [extrait le Feb. 3, 2014].

PCT International Search Report for PCT/EP2014/061897 dated Sep. 15, 2014.

PCT International Search Report for PCT/EP2014/058008 dated May 26, 2014.

(56) References Cited

OTHER PUBLICATIONS

Foote J et al: 'FlyCam: Practical Panoramic Video and Automatic Camera Control', Multimedia and Expo, 2000. ICME 2000. 2000 IEEE International Conference on New York, NY, USA Jul. 30-Aug. 2, 2000, Piscataway, NJ, USA, IEEE, US, vol. 3, Jul. 30, 2000 (Jul. 30, 2000), pp. 1419-1422, XP010512772, DOI: 10.1109/ICME.2000.871033 ISBN: 978-0-7803-6536-0.

Hossein Afshari et al: "The Panoptic Camera: A Plenoptic Sensor with Real-Time Omnidirectional Capability", Journal of Signal Processing Systems, vol. 70, No. 3, Mar. 14, 2012 (Mar. 14, 2012), pp. 305-328, XP055092066, ISSN: 1939-8018, DOI: 10.1007/s11265-012-0668-4.

Benjamin Meyer et al: "Real-time Free-Viewpoint Navigation from Compressed Multi-Video Recordings", Proc. 3D Data Processing, Visualization and Transmission (3DPVT), May 31, 2010 (May 31, 2010), pp. 1-6, XP055091261, Extrait de l'Internet: URL:http://www.cg.cs.tu-bs.de/media/publications/meyer2010realtime.pdf [extrait le Dec. 3, 2013].

Lipski, C.: "Virtual video camera", SIGGRAPH '09: Posters On, SIGGRAPH '09, vol. 0, Jan. 1, 2009 (Jan. 1, 2009), pp. 1-1, XP055091257, New York, New York, USA DOI: 10.1145/1599301.1599394.

Felix Klose et al: "Stereoscopic 3D View Synthesis From Unsynchronized Multi-View Video", Proc. European Signal Processing Conference (EUSIPCO), Barcelona, Spain, Sep. 2, 2011 (Sep. 2, 2011), pp. 1904-1909, XP055091259, Extrait de l'Internet: URL:http://www.cg.cs.tu-bs.de/media/publications/eusipco2011_3d_synth.pdf [extrait le Dec. 3, 2013].

PCT International Search Report for PCT/EP2014/057352 dated Jun. 27, 2014.

U.S. Appl. No. 14/920,427, filed Oct. 22, 2015, entitled "Apparatus and Methods For Embedding Metadata into Videa Stream".

U.S. Appl. No. 14/949,786, filed Nov. 23, 2015, entitled "Apparatus and Methods for Image Alignment".

U.S. Appl. No. 14/927,343, filed Oct. 29, 2015, entitled "Apparatus and Methods for Rolling Shutter Compensation for Multi-Camera Systems".

U.S. Appl. No. 15/001,038, filed Jan. 19, 2016, entitled "Metadata Capture Apparatus and Methods".

"Spatial Audio Lecture Series," Regents of the University of California at Berkeley, Center for New Music and Audio Technologies, 2015, 1 Page, [online] [retrieved on Aug. 20, 2015] Retrieved from the internet <URL:http:l/cnmat.berkelev.edu/spatialaudiolectures>.

O'Donovan, A., et al., "Real Time Capture of Audio Images and their Use with Video," 2007 IEEE Workshop on Applications of Signal Processing to Audio and Acoustics, Oct. 21-24, 2007, pp. 10-13.

O'Donovan, A., et al., "Audio-Visual Panoramas and Spherical Audio Analysis using the Audio Camera," C1 Proceedings of the 16th International Conference on Auditory Display, Jun. 9-15, 2010, pp. ICAD-167-168, can be retrieved at <URL: https://smartech.gatech.edu/bitstream/handle/1853/49858/0%27DonovanDuraiswami201 O.pdf?sequence=1 >.

PCT International Search Report and Written Opinion for PCT/US15/38913, dated Sep. 29, 2015, 15 Pages.

\* cited by examiner

Number of frames

```
for dy = 0, ··· , height/2 do
    for x = 0, ··· , width do
        W₁(t, x, y_iso − dy, c) = Ĩ₁(t, x + w_X(t, x), y_iso − dy + w_Y(t, x), c)
        W₂(t, x, y_iso + dy, c) = Ĩ₁(t, x − w_X(t, x), y_iso + dy − w_Y(t, x), c)
    end for
    w_X(t, ·) = (0.99/4)[1, 2, 1] ∗ w_X(t, ·)
    w_Y(t, ·) = (0.99/4)[1, 2, 1] ∗ w_Y(t, ·)
end for
```

FIG. 15

APPARATUS AND METHODS FOR IMAGE ALIGNMENT

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Field of the Disclosure

The present disclosure relates generally to processing of images collected with multiple cameras and more particularly in one exemplary aspect to computer apparatus and methods for image alignment in presence of parallax distortion.

Description of Related Art

A panoramic video may be obtained by either using a single large field of view lens or a multiple lenses camera with overlapping field of view. A single lens camera may not be able to obtain target field of view (360°×180° capture). Image transformation, image combining, and/or image stitching may be employed when producing an image characterized by, e.g., a wider field of view compared to one or more source images. When shooting, e.g., a 360° video using a multiple lenses camera, the image sensor of individual cameras may be displaced from one another. Such displacement may cause parallax errors in stitched video. The parallax errors may cause mismatch between, e.g., images obtained with individual cameras.

SUMMARY

The disclosure relates to a computerized system configured to obtain a composite image. A computerized system configured to obtain a composite image may include a capture device, a processor, and/or other components. The capture device may be configured to obtain source images, which may include a first source image and a second source image. The processor may be adapted to transform the source images and combine the transformed source images to obtain the composite image.

In some implementations, the capture device may include a first lens and a second lens. The first lens may be optically coupled to a first image sensor, and the second lens may be optically coupled to a second image sensor. The first image sensor may be configured to obtain the first source image and the second image sensor may be configured to obtain the second source image.

In some implementations, the field of view of the first lens may be configured to point in a first direction, and the field of view of the second lens may configured to point in a second direction opposing the first direction. In some implementations, the first lens and the second lens may be characterized by a fish-eye lens pattern with a field of view of at least 180 degrees. The first source image and the second source image may cover at least 180×180 degree field of view, and the composite image may be configured to cover 360×180 degree field of view. In some implementations, the composite image may be configured in an equirectangular plane characterized by latitudinal and longitudinal dimensions, and the boundary between the first source image and the second source image may be configured at a half point along the latitudinal dimension.

In some implementations, individual pixels of the first source image and the second source image may be characterized by a brightness component and a chromaticity component. The processor may be adapted apply a color correction operation configured to reduce the difference between the chromaticity components of the pixels of the first source image at the boundary relative to the chromaticity components of the pixels of the second source image at the boundary. The processor may be adapted to apply an exposure correction operation configured to reduce the difference between the brightness components of the pixels of the first source image at the boundary relative to the brightness components of the pixels of the second source image at the boundary.

The processor may be adapted to identify overlapping portions of the source images. Overlapping portions may include a first portion and a second portion. The first potion may include a first plurality of pixels within the first source image, and the second portion may include a second plurality of pixels within the second source image. In some implementations, the first plurality of pixels and the second plurality of pixels may form a boundary between the first source image and the second source image. In some implementations, the boundary may include an iso-line encompassing 180 degree field of view boundary of a first lens.

The processor may be adapted to obtain a disparity measure for corresponding locations in the first source image and the second source image. The disparity measure may be obtained based on an evaluation of pixels of the first plurality of pixels and pixels of the second plurality of pixels at the corresponding locations.

The processor may be adapted to obtain a transformation operation. The transformation operation may be configured to displace pixels of one or both of the first plurality of pixels and/or the second plurality of pixels to reduce the disparity measure.

In some implementations, the transformation operation may be configured based on an output of a feature selection operation. The feature selection operation may determine a first smoothed version of the first source image based on a spatial smoothing operation with a first smoothing kernel characterized by a first smoothing scale. The feature selection operation may determine a first location of a feature of a transformation cost function for a given disparity based on the first smoothed version of the first source image. The feature selection operation may determine a second smoothed version of the first source image based on the spatial smoothing operation with a second smoothing kernel characterized by a second smoothing scale, with the second smoothing scale configured greater than the first smoothing scale. The feature selection operation may adjust the first location based on a disparity using the second smoothed version of the first source image.

In some implementations, the feature may correspond to a value of disparity such that an absolute value of a second derivative of the transformation cost function is below a given value. In some implementations, the cost indicated by the transformation cost function may vary as a function of a sum of squared differences between a pixel value of the first source image at a given location in the first source image and a pixel value of the second source image at a location in the second source image that corresponds to the given location in the first source image.

In some implementations, the transformation operation may be configured to reduce a contrast measure within the composite image. In some implementations, the contrast measure may be determined based on the difference of chromaticity components of pixels of the first source image and pixels of the second source image at the boundary between the first source image and the second source image. In some implementations, the contrast measure may be determined based on the difference of brightness components of pixels of the first source image and pixels of the second source image at the boundary between the first source image and the second source image.

The processor may be adapted to apply the transformation operation to the source images, including the pixels within the overlapping portions of the source images, to generate transformed source images. In some implementations, the transformation operation may be configured to displace one or more of the pixels of the first plurality of pixels disposed at a boundary between the first source image and the second source image. One or more of the pixels of the first plurality of pixels disposed at the boundary may be displaced by a first displacement along a first direction, and one or more of the pixels of the second plurality of pixels disposed at the boundary may be displaced by the first displacement along a second direction.

In some implementations, the first direction and the second direction may be configured tangential to an epipolar line associated with a given pixel location. The epipolar line may be configured based on a geometry of a camera used to obtain the first source image. The direction may be characterized by a first displacement component configured based on a trigonometric cosine operation of the epipolar line and a second displacement component configured based on a trigonometric sine operation of the epipolar line. In some implementations, the transformation operation may include an extrapolation operation configured to displace at least one pixel disposed outside the boundary by a second displacement, where the second displacement may be based on the first displacement and a distance between the given pixel and the at least one pixel disposed outside the boundary. In some implementations, the second displacement may be reduced inversely with the distance. In some implementations, the extrapolation may include a spatial smoothing operation.

The processor may be adapted to obtain the composite image by combining the transformed source images.

Another aspect of the disclosure relates to a capture device. The capture device may include a first lens, a second lens, a first image sensor, a second image sensor, a processor, a non-transitory storage medium, and/or other components. The processor may be in operable communication with the first image sensor and the second image sensor.

The first lens may be optically coupled to the first image sensor, and the second lens may be optically coupled to the second image sensor. The first lens may be characterized by a first optical center location and the second lens may be characterized by a second optical center location. In some implementations, the first lens and the second lens may be characterized by a fish eye field of view. The first image sensor may be configured to obtain a first source image, and the second image sensor may be configured to obtain a second source image.

The non-transitory storage medium may be configured to store a plurality of computer instructions which may be executed by the processor. The plurality of computer instructions may include instructions which, when executed by the processor, identify a boundary region between the first source image and the second source image. The boundary region may include first pixels of the first source image and second pixels of the second source image.

The plurality of computer instructions may include instructions which, when executed by the processor, obtain a disparity measure. The disparity measure may be based on an evaluation of one or more of the first pixels and one or more of the second pixels disposed at a given location within the boundary region. The given location may have an epipolar line associated therewith. The epipolar line may include a segment configured to connect the first optical center location, the second optical center location, and the given location.

The plurality of computer instructions may include instructions which, when executed by the processor, obtain a transformation operation. The transformation operation may be configured to displace pixels within the boundary region along a direction configured tangential to the epipolar line for the given location. The transformation operation may be configured to reduce the disparity measure.

In some implementations, the plurality of computer instructions may include instructions which, when executed by the processor, convert the first source image and the second source image into an equirectangular plane so that the boundary region is transformed into a straight segment. In some implementations, the transformation operation may be configured to be applied to an output of the conversion of the first source image and the second source image into the equirectangular plane.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 15 is a listing of an exemplary algorithm for extrapolating warp towards a center of respective lens.

Figure 1:
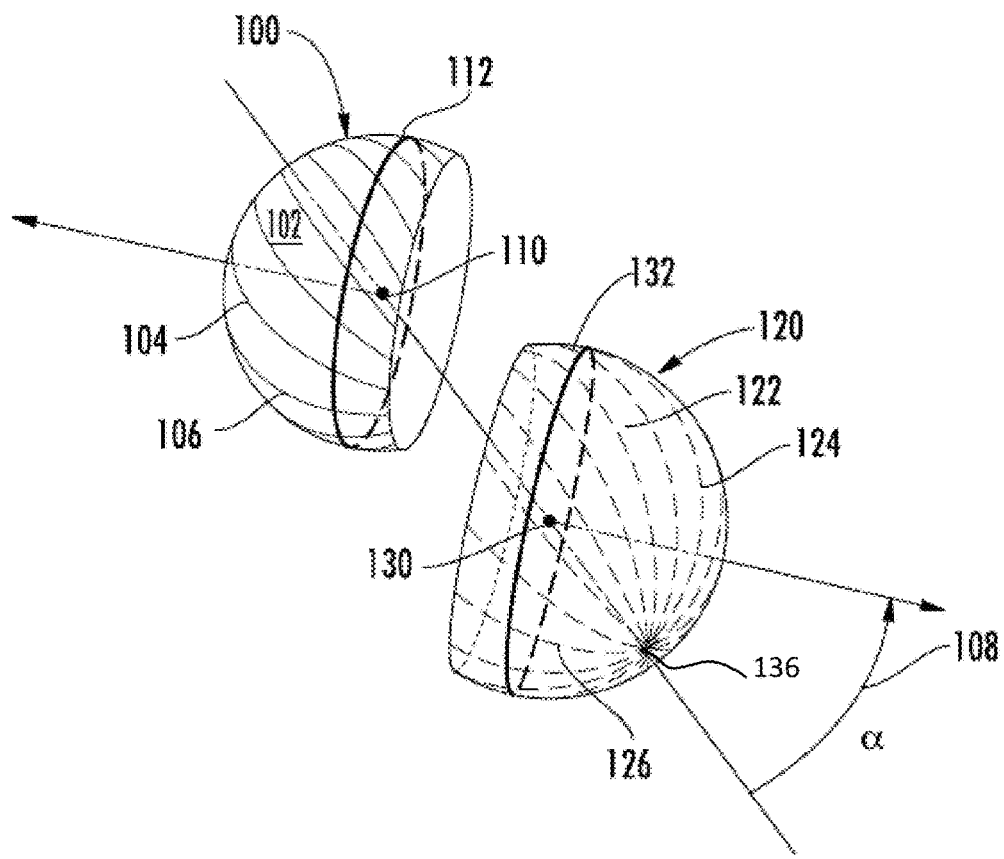
FIGS. 1-2 are graphical illustrations depicting field of view (FOV) of a capture device in accordance with one implementation.

All Figures disclosed herein are © Copyright 2015 GoPro Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present invention will be described, and detailed descriptions of other portions of such known components will be omitted so as not to obscure the disclosure.

In the present specification, an implementation showing a singular component should not be considered limiting; rather, the invention is intended to encompass other implementations including a plurality of the same component, and vice-versa, unless explicitly stated otherwise herein.

Further, the present disclosure encompasses present and future known equivalents to the components referred to herein by way of illustration.

An image and/or video may be obtained using a capture device comprising multiple lenses and/or multiple image sensors. As used herein the term, combined image, composite image, combined frame, and/or stitched image may be used to describe an image that may be obtained based on a combination of two or more images (also referred to as source images). Such combined image and/or video of images may be referred to as panoramic and/or wider angle of view image, as compared to one or more source images. In some implementations, a 360° video stream may be synthesized by projecting the source videos from 6 cameras (e.g., using apparatus 800 of FIG. 8) onto the equirectangular space (e.g., as shown by panel 400 in FIG. 4A). Individual images may be obtained with one or more capture devices characterized by one or more image parameter that may differ from one source image to another source image. For example, one source image (e.g., the image 1000 shown in FIG. 10A) may be characterized by a lens nodal point, dimensions of lens field of view (FOV), position of the FOV, lens orientation, image resolution, and/or other parameter relative another image (e.g., the image 1010 shown and described in detail with respect to FIG. 10B). In some implementations wherein a combined/composite image may be characterized by a greater area of coverage within visual field (e.g., greater FOV) compared to one or more of the source images, such combined image may be referred to as the panoramic and/or wider angle of view image, e.g., as the images in frames 1020, 1040 shown in FIGS. 10C, 10D that cover 360°×180° field of view, while the corresponding source images 1000, 1010 in FIGS. 10A-10B cover 180°×180° field of view.

Figure 7:
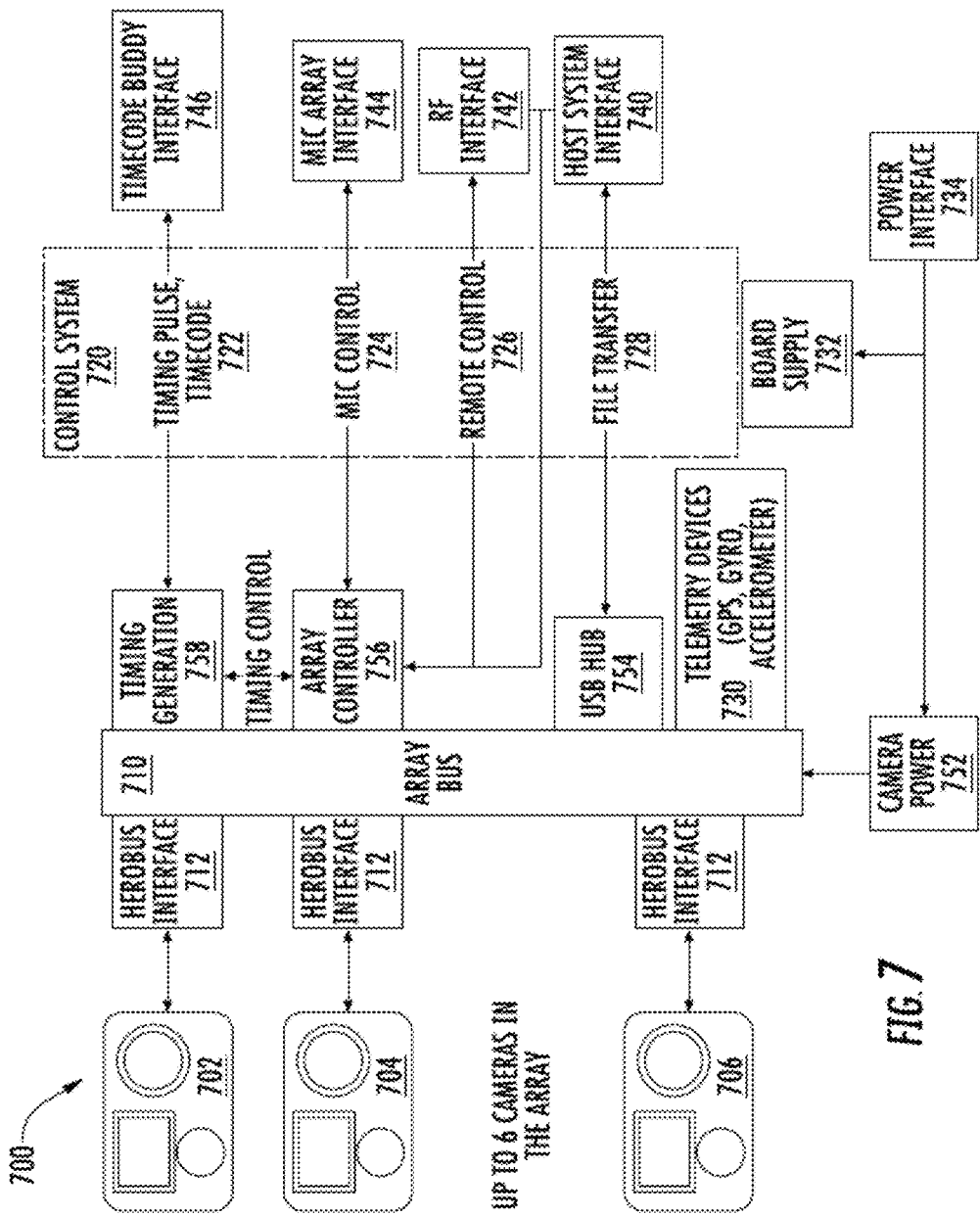
FIG. 7 is a functional block diagram illustrating an exemplary multi-camera system configured for image acquisition in accordance with one implementation.
Figure 8:
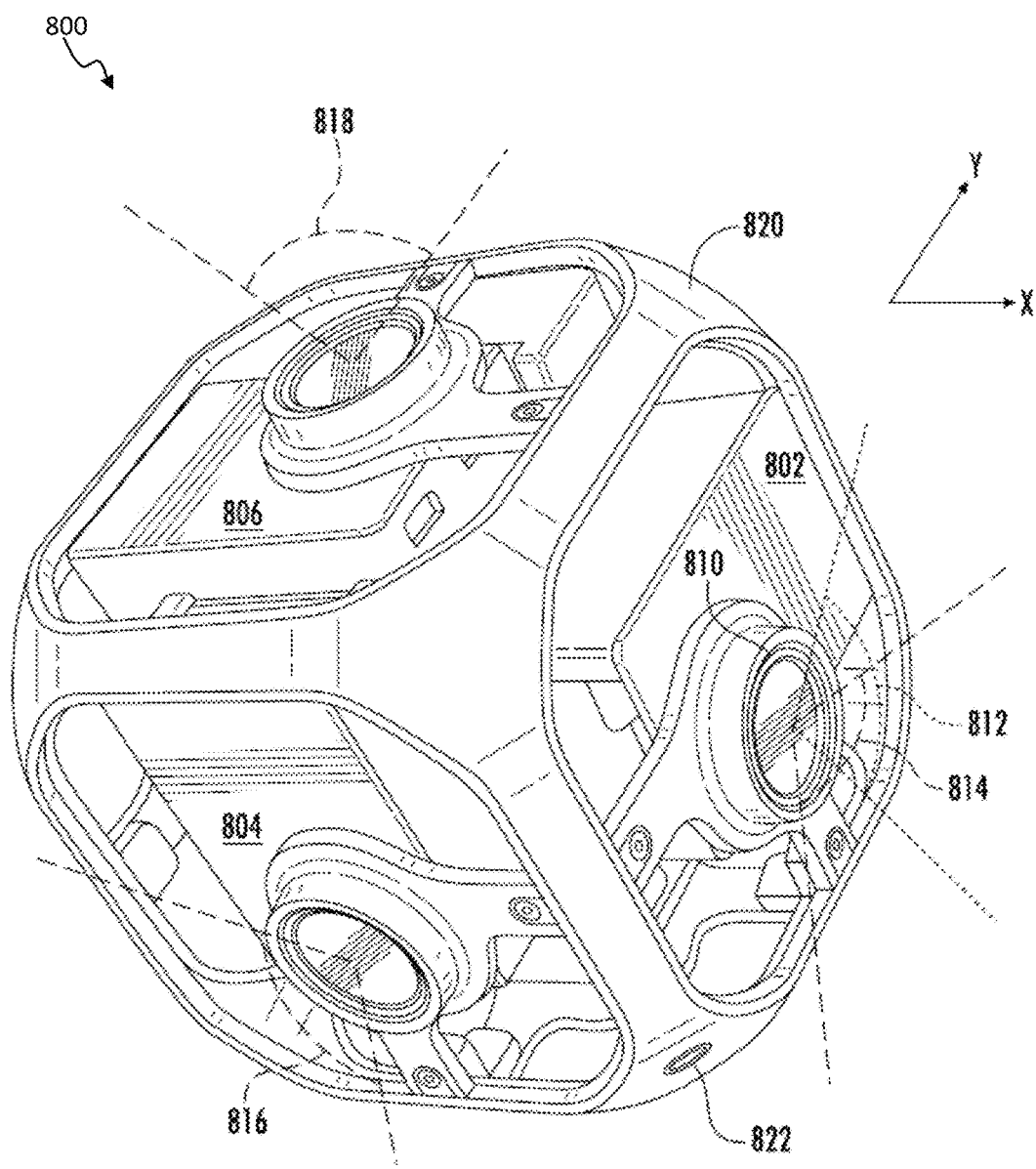
FIG. 8 is graphical illustration depicting an exemplary 6-camera imaging system in cube-shaped cage in accordance with one implementation.

Various capture device implementations may be utilized for obtaining panoramic images e.g., such as shown and described with respect to FIG. 7, FIG. 8, and/or described in U.S. Patent Application Ser. No. 62/134,567, entitled "UNI BODY DUAL-LENS MOUNT FOR A SPHERICAL CAMERA", filed 18 Mar. 2015, and/or U.S. Provisional Patent Application Ser. No. 62/166,584, entitled "MULTI CAMERA MOUNT" filed on 26 May 2015, each of the foregoing being incorporated herein by reference in its entirety.

Figure 10A:
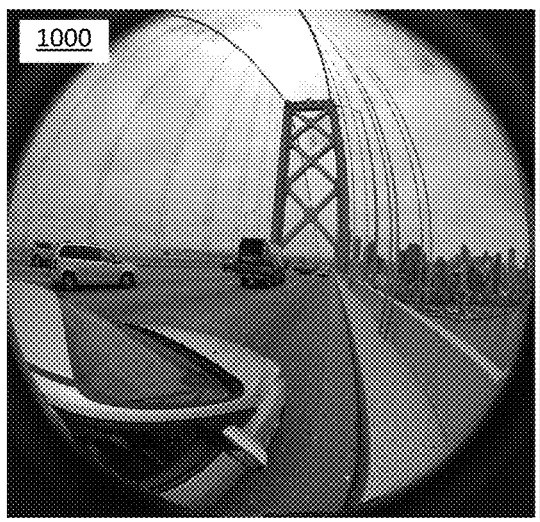
FIGS. 10A-10D present digital images obtained by assignee thereof illustrating image transformation methodology in accordance with one implementation of the disclosure.
Figure 10B:
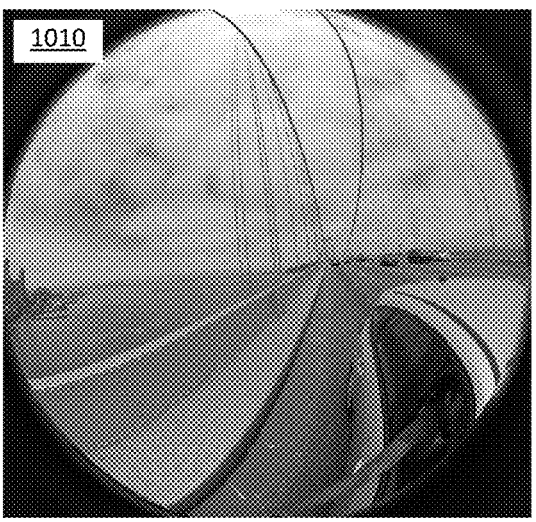
Figure 10C:
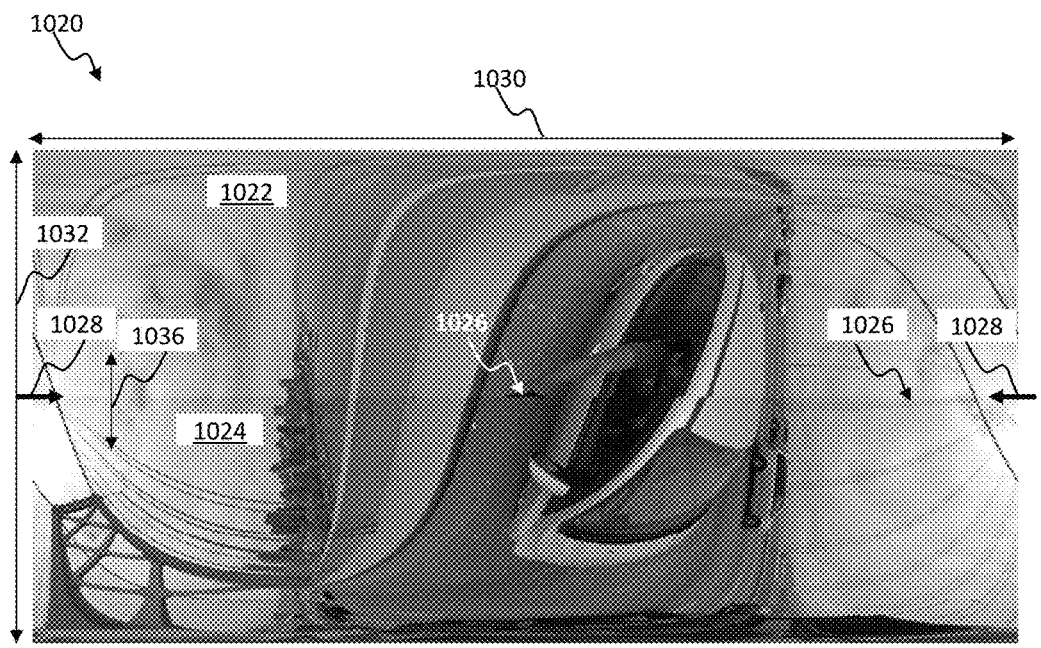

FIG. 10C illustrates mismatch between two images obtained using a capture device comprising two lenses characterized by spherical or near-spherical FOV, cameras, e.g., the device of FIG. 1 of Application '567 incorporated supra.

In order to reducing (or altogether remove) the missalignment between source images, image transformation operation may be applied to a portion of one or multiple source images. In some implementations, the image portion may be selected to correspond to a boundary region between two source images (e.g., area denoted 411 in FIG. 4A). The transformation may comprise a local continuous warp of both sides of the boundary between the images. Region separating two images may be referred to as the border (e.g., shown by line 212 in FIG. 2) also referred to as the iso-line and/or iso-curve. In some implementations, the iso-line may be determined as 180° boundary of FOV of a lens.

For a pixel of a boundary region, the warp transformation may be defined as a 1D to 2D transformation configured to produce an asymmetric (with respect to the border) between the two images) 2 directional displacement, in some implementations.

Figure 2:
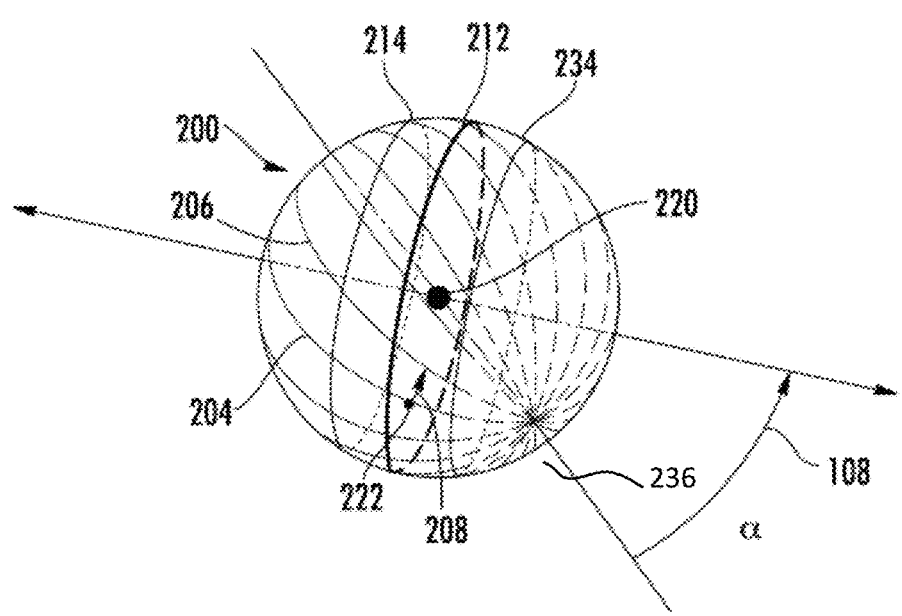

Given a 3-D geometry of the capture device used to produce the source images (e.g., relative positions of the optical centers of the two lenses), the warp transformation may be expressed as 1-D to 1-D transformation, wherein the direction of displacement of a pixel in the boundary region may be configured tangential to the epipolar lines associated with the respective lens (e.g., shown by solid and broken curves in FIGS. 1-2, e.g., 106, 106, 126, 124, 206, 204). As used herein the term epipolar line and/or epipolar curve may be used to describe what is commonly known as an epipolar line in 2-dimensional planar geometry of two lenses. The epipolar may correspond to a segment (linear or curved) connecting epipoles of two lenses for given locations in the images produced by the lenses. By way of an illustration, in spherical coordinates illustrated in FIG. 2, epipolar curves form circular segments passing via epipole locations (e.g. such as shown by location 236) of the combined lenses. The epipolar lines may provide a spatial constraints for displacement of pixels during image transformation (image warp).

In some implementations, the warp transformation may be numerically solved for pixels along the border (e.g., 1-D iso-line) to provide an image merged at a reduced computational processing load compared to the warp transformation performed for the entire 2-D region of overlap. The image transformation methodology of the disclosure may enable obtaining a combined image without requiring depth estimation for source images, thereby reducing computational load and/or processing time compared to existing approaches. In some implementations, the computational load may be reduced by an order O(n) where n is width of the image, and operation O( ) may refer to an order of common functions.

FIG. 1 illustrates field of view (FOV) two lenses characterized by spherical or near-spherical FOV, for use in, e.g., capture device 800 of FIG. 8 and/or device of FIG. 1 of Application '567, in accordance with some implementations.

FIGS. 1-2 are graphical illustrations depicting field of view (FOV) of a capture device in accordance with one implementation. In some implementations, the field of view 100 (depicted by hashed surface 102) may correspond to lens of the camera 802 in FIG. 8; field of view 120 (depicted by hashed surface 122 in FIG. 1) may correspond to lens of a camera deposed opposite (not shown) the camera 802 in FIG. 8. Locations 110, 130 denote nodal locations of lenses (also referred to as lens centers) corresponding to FOV 100, 120, respectively. Angle α shown by arc 108 denotes orientation of the base line of the two lenses. Broken lines 104, 106, 124, 126 in FIG. 1, denote epipolar lines associated with the two lenses. Bold solid lines 112, 132 denote iso-line (e.g., the 180° boundary of the lenses FOV).

FIG. 2 depicts FOV of a dual lens capture device. The FOV 200 in FIG. 2 may be obtained by combining the FOV 100 and FOV 120. Bold solid line 212 denotes the iso-line (e.g., the corresponding to location of the lines 112, 132 in FIG. 1). Lines denoted 214, 234 in FIG. 2 depict region of overlap between FOV of two lenses. Location 220 may denote nodal location (optical center) of the capture device lenses. Broken lines 204, 206 in FIG. 2, denote epipolar lines associates with the two lenses. Location 236 may denote an epipole of the combined lens apparatus. A given location (e.g., 222 in FIG. 2) in the visual environment that may be visible by the two lenses of a capture device (e.g., location that may appear in both images) may project on a given epipolar line, e.g., denoted 204 in FIG. 2. Accordingly, the warp transformation of the source images may be constructed with that pixel displacement may occur in a direction tangential to this epipolar line (e.g., direction denoted by arrow 208 in FIG. 2).

Individual epipolar lines may be characterized by the angle α between the base line defined by the 2 lens centers and the optical axis of the lenses. In some implementations, wherein the capture device may be subject to motion during image acquisition, epipolar lines may become distorted (bent) rolling shutter image distortion may occurred. As described in detail in U.S. patent application Ser. No. 14/927,343, entitled "APPARATUS AND METHODS FOR ROLLING SHUTTER COMPENSATION FOR MULTI-CAMERA SYSTEMS", filed on 29 Oct. 2015, the foregoing being incorporated herein by reference in its entirety, motion-induced distortion may occurred when the image sensor (e.g., CMOS sensor) may be characterized by a time window during which a given image may be acquired (e.g., row-by-row image scan by a CMOS sensor). The above cited application '343 describes some implementations of rolling shutter image correction.

Figure 3:
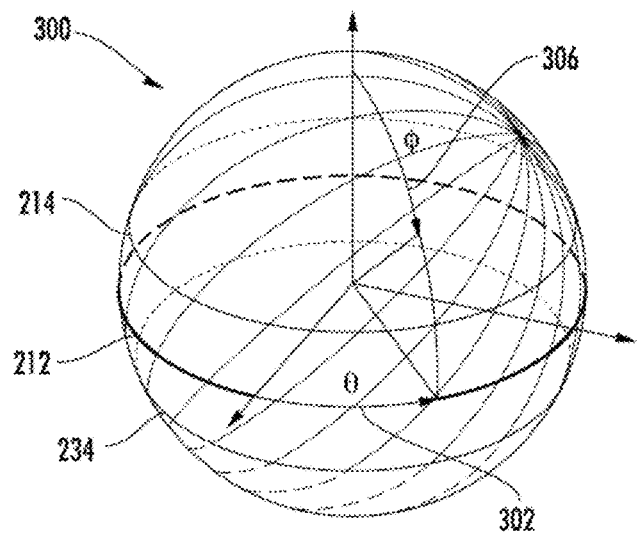
FIG. 3 is graphical illustrations depicting spherical coordinate system useful for characterizing images obtained with a capture device in accordance with one implementation.

FIG. 3 illustrates spherical coordinate system useful for characterizing image transformation of the disclosure in accordance with one implementation. Spherical angle θ, denoted by arrow 302 in FIG. 3 may be used to denote location of a pixel along the iso-line 212 in FIG. 3. Spherical angle φ, denoted by arrow 306 in FIG. 3 may be used to denote a location away from the iso-line 212.

Figure 4A:
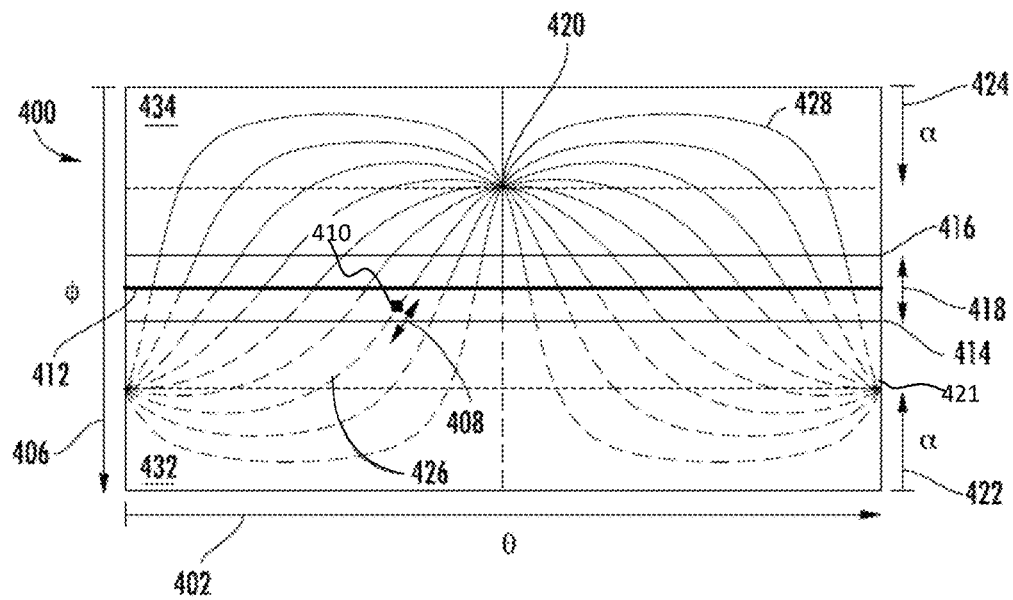
FIG. 4A is a plot depicting epipolar lines of two spherical lenses as projected onto an equirectangular plane in accordance with one implementation.

FIG. 4A depicts epipolar lines of two spherical lenses as projected only equirectangular plane in accordance with one implementation. The equirectangular plane 400 may be characterized by a latitudinal dimension 406 corresponding to the angle φ 306 of FIG. 3; and a longitudinal dimension 402 corresponding to the angle θ 302 of FIG. 3. Line 412 in FIG. 4A may denote iso line 212 in FIG. 2, lines 414, 416 may denote latitudinal extend of the area of overlap; curves in FIG. 4A (e.g., 428, 426) may denote epipolar lines of the capture device (e.g., curves 208, 210 in FIG. 2). Locations 420, 421 may denote location of epipoles of the combined 360° FOV of the capture device. One of the locations 420, 421 may correspond to the epipole 236 in FIG. 2.

Figure 4B:
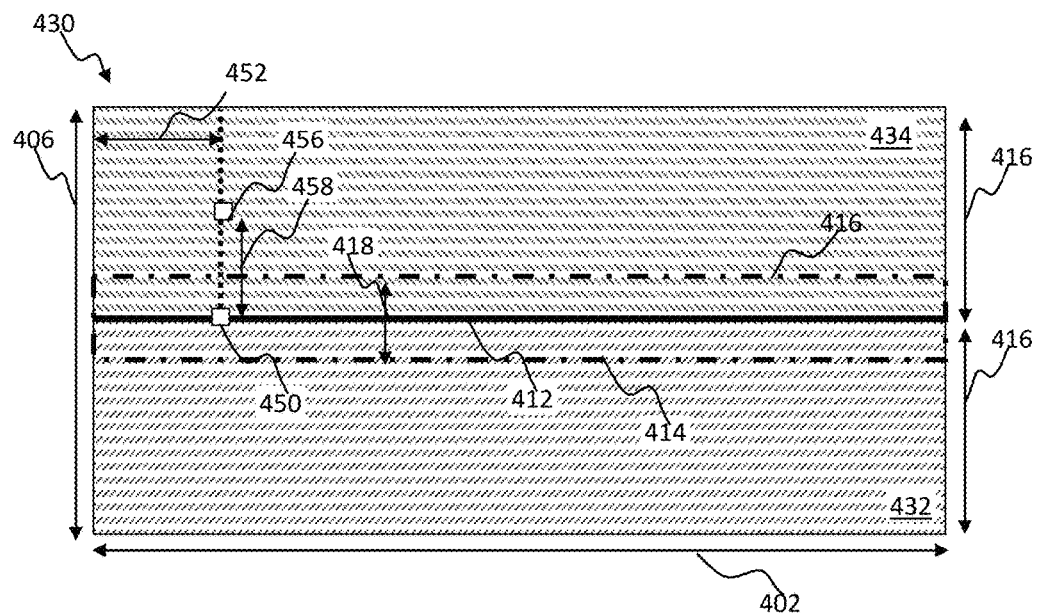
FIG. 4B is a graphical illustration depicting an area of overlap of two images projected onto an equirectangular plane in accordance with one implementation.

FIG. 4B illustrates composite frame comprising an area of overlap of two images projected onto an equirectangular plane in accordance with one implementation. The combined image 430 (also referred to as the frame) may be composed of two source images I1, I2 (e.g., 1000, 1010 in FIGS. 10A-10B) projected onto equirectangular plane and shown by vertically hashed rectangle 432, and horizontally hashed rectangle 434. Vertical arrow 418 denotes latitudinal extent of the overlap area. In some implementation, e.g., such as shown and described with respect to FIGS. 10A-10D, the overlap dimension (indicated by vertical arrow 418) may be selected at about ⅕ of the image latitudinal extent (e.g., 170 pixels in for frame 1020 of FIG. 10C).

In order to describe the image transformation, the following notation may be used:

t denotes a frame number, a given frame denotes a composite image that may be constructed from multiple source images; multiple source images may form a frame;

x denotes an abscissa in a working projection;

$y_{iso}$ denotes an ordinate of iso-line in the working projection;

D denotes image width in working projection;

H denotes image height in working projection;

c denotes the pixel channel (e.g., one of grayscale, RGB, HSV, YUV, and/or other pixel representatiosn);

nbc denotes number of image channels;

nb denotes number of frames;

$I_1(f, x, y, c)$ denotes a pixel value of image 1 in the working projection;

$I_2(f, x, y, c)$ denotes a pixel value of image 2 in the working projection;

$\hat{I}_1(f, \cdot, \cdot, c)$ denotes bicubic spline interpolation of $I_1$ $(f, \cdot, \cdot, c)$;

$\hat{I}_2(f, \cdot, \cdot, c)$ denotes bicubic spline interpolation of $I_2$ $(f, \cdot, \cdot, c)$;

$W_1$ denotes transformed (warped) image $I_1$; and $W_2$ denotes transformed (warped) image $I_2$.

For a given frame (e.g., 430 in FIG. 4B) individual source images may be projected on a working space. In some implementations, the working space may be determined as the equirectangular plane, and the projection may comprise equirectangular projection operation. In the equirectangular plane, the boundary (iso-line 212 in FIG. 2) between two projected images 432, 434 may be represented by where the between the projected image maybe represented as a straight line 412 in FIG. 4B. In some implementation, a smoothing operation may be applied to one or more source images (e.g., images 1000, 1010 in FIG. 10A-10B). The smoothing operation may be effectuated by convolving a source image with a Gaussian kernel. In some implementations, the smoothing operation may be utilized in order to obtain image warping transformation at a given scale. Dimensions of the smoothing kernel may be selected from a range between 3 and 11. In one implementation of a multi-scale warp, smoothing operation may be configured based on three Gaussian kernels with dimensions of 61, 21, and 3 pixels. Individual smoothing kernels may be applied to the source image to obtain three smoothed versions of the image in order to obtain warp transformations at three scales corresponding to spatial dimension represented by 61 pixels, 21 pixels and 3 pixels. By way of an illustration, for an image sensor with horizontal dimension of 6 mm providing an image comprised of 4000 pixels (in horizontal dimension) the above smoothing scales may correspond to 0.092 mm, 0.032 mm, and 0.005 mm, respectively, image sensor footprint. As will be appreciated by those skilled in the arts, that above smoothing scales, image sensor size, and image size are exemplary and may be adapted for a given application.

Capture device used to obtain source images may comprise individual cameras characterized by an Opto-Electronic Conversion Function (OECF), exposure value, white balance value, and/or other characteristics. The camera OECF may be utilized to define a relationship between input luminance and the grayscale or digital output from the imaging sensor. Parameters of individual cameras used to obtain source images for a given frame may be estimated and/or matched to one another. By way of an illustration, for a given frame, the OECF, exposure and white balance may be estimated for individual cameras and/or matched to one another to obtain match of color and brightness of corresponding pixels of images $I_1$ and $I_2$. In one or more implementations, image matching (colorimetric correction) may be implemented using approach described in detail in D. Hasler, "Modelling the Opto-Electronic Conversion Function (OECF) for Application in the Stitching of Panoramic Images," Proc. International Conference on Imaging Systems, p. 379-380 (2002), the foregoing being incorporated herein by reference in its entirety. Image colorimetric correction may be configured based on an exposure coefficient for one of the two source images. When the source images comprise color information, two white balance coefficients may be utilized to modify one of the source images.

In one or more implementations a vignette correction may be applied to one or more of the source images (e.g., the images 1000, 1010).

For images comprised of multiple channels (e.g., RGB, HDV), individual image color channel c (in RGB space) may be interpolated by a bicubic or bilinear spline operation $\hat{I}_1(f, \cdot, \cdot, c)$, $\hat{I}_2(f, \cdot, \cdot, c)$. Interpolates images $\hat{I}_1$ may be characterized by color parameters (e.g., exposure, white balance) that are the same or close to that of the image $\hat{I}_2$.

Figure 5A:
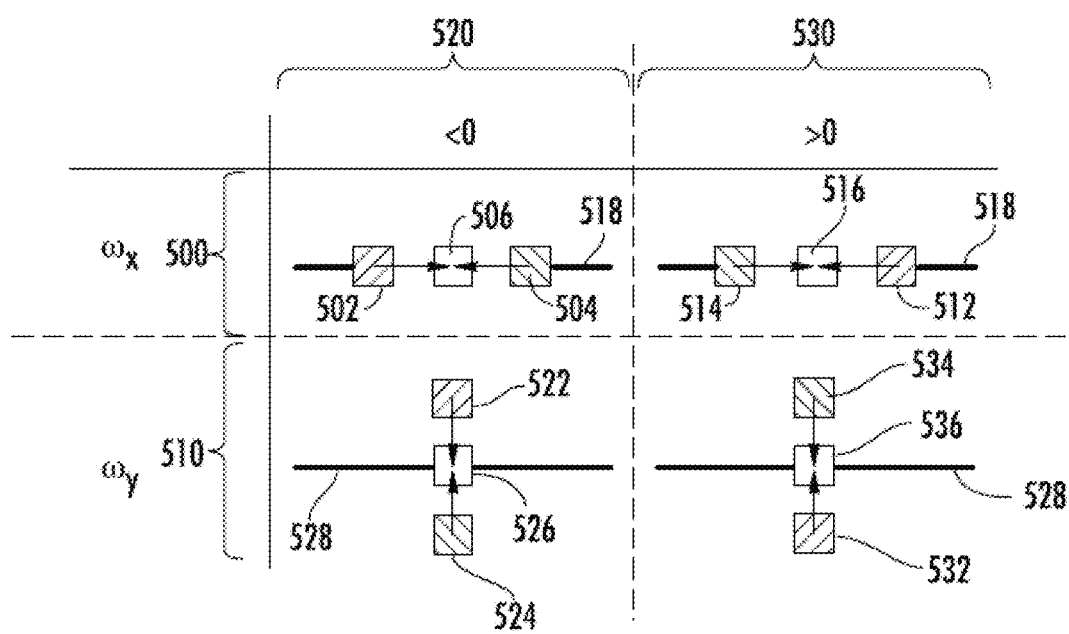
FIG. 5A is a graphical illustration depicting image transformation for obtaining a composite image in accordance with one implementation.

FIG. 5A illustrates image transformation for obtaining a composite image in accordance with one implementation. An image transformation (image warp) may be determined as follows:

$$w(x)=(w_X(t,x), w_Y(t,x)), \forall x \in [0, \text{width}-1], \forall t \in [0, nb-1], \quad \text{(Eqn.1)}$$

where $w_X(t, x)$, $w_Y(t, x)$, $X(t, x)$ denote (x,y) components of displacement of a pixel located at abscissa x of frame f. Formulation of Eqn. 1 may be determined for pixels in the boundary region between two given source images and provides for a 2-D symmetric warp that may be applied to portions of individual source images proximate the iso-line. In some implementations, transformation of Eqn. 1 may be solved for pixels located on the boundary between the two source images using a nonlinear least squares minimizer. At rendering of the combined image, the warp transformation may be applied to the combined image, e.g., progressively smoothed and faded out as described elsewhere herein.

For a video comprises of a series of nb frames a global optimization may be performed on 2×nb×W variables as follows. For a given frame f and a given position along the boundary line x, the two-dimensional warp $(w_x(t,x), w_y(t,x))$ may be reduced to determining a one dimensional value of disparity(t,x). Warp components $(w_x(t,x), w_y(t,x))$ may be determined from disparity(t,x) and epipolar line direction θ:

$$w_x(t,x)=\text{disparity}(t,x)\cos(\theta), w_y(t,x)=\text{disparity}(t,x)\sin(\theta). \quad \text{(Eqn.2)}$$

As used herein the terms "mathematical optimization", "optimization', and/or "mathematical programming" may refer to a process configured to enable selection of a given feature (with regard to a given criteria) from multiple alternative elements. The criteria used in optimization process may be referred to as a cost function. In some implementations, the selected feature may correspond to a value of second derivative of the cost function that meets some criteria (for example, being equal to zero). In some implementations, such feature may be referred to as minimum of the cost function.

Disparity may be determined based on a difference between a value of a pixel at a location along epipolar line (e.g., pixel 450 in FIG. 4B) for image $I_1$ and a value of a pixel in the image $I_2$ at the same location:

$$\text{disparity}(t,x,c)=\hat{I}_1(f,\cdot,\cdot,c), \hat{I}_2(f,\cdot,\cdot,c), \quad \text{(Eqn. 3)}$$

where disparity (t,x,c) is disparity at location x, frame f, and channel c. In some implementations wherein image pixels may be characterized by multiple channels, the disparity may be determined as a sum of absolute values of disparity for individual channels.

As may be noted from formulation of Eqn. 1-Eqn. 3 the transformation w(x) may be referred to as a 1-D transformation (within a given frame) wherein for a given border pixel x the transformation Eqn. 1 may be configured based on the disparity at that location x. The output $(w_x, w_y)$ may be determined from the disparity value and the known epipolar lines (that may be obtained based on the camera geometry).

As shown in FIG. 5A by row 500, when determining x component displacement (e.g., horizontal in FIG. 5A) during the image warp operation, negative value of disparity (shown by column 520) may correspond to pixels of the source image 434 be displaced to the left along longitudinal (x-axis) direction (shown by left arrow emanating from pixel 502 in FIG. 5A); positive value of disparity (shown by row 530) may correspond to pixels of the source image 434 be displaced to the right along longitudinal (x-axis) direction (shown by right emanating from pixel 504 in FIG. 5A).

When determining y component of pixel displacement (e.g., vertical in FIG. 5A and shown by row 510) during warp operation, negative value of disparity (column 520) may correspond to pixels of the source image 432 be displaced downward (along latitudinal (y-axis) direction) as shown by downward arrow emanating from pixel 512 in FIG. 5A; positive value of disparity may correspond to pixels of the source image 434 be displaced to downward along latitudinal (y-axis) direction (shown by downward arrow emanating from pixel 514 in FIG. 5A).

Figure 5B:
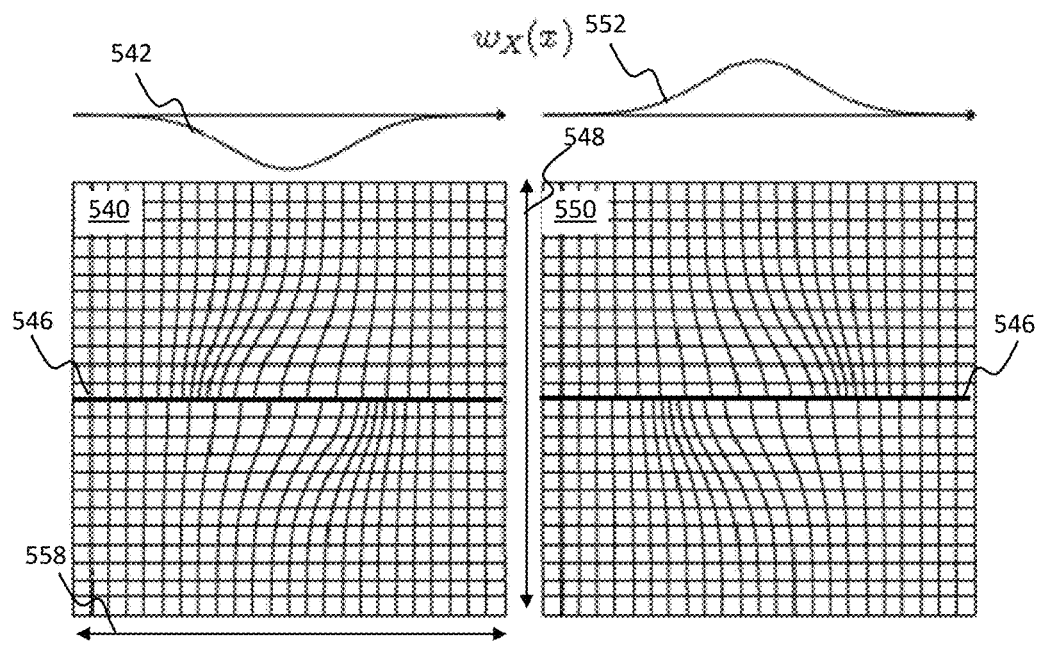
FIGS. 5B-5C illustrate image transformation for obtaining a composite image in accordance with one implementation.
Figure 5C:
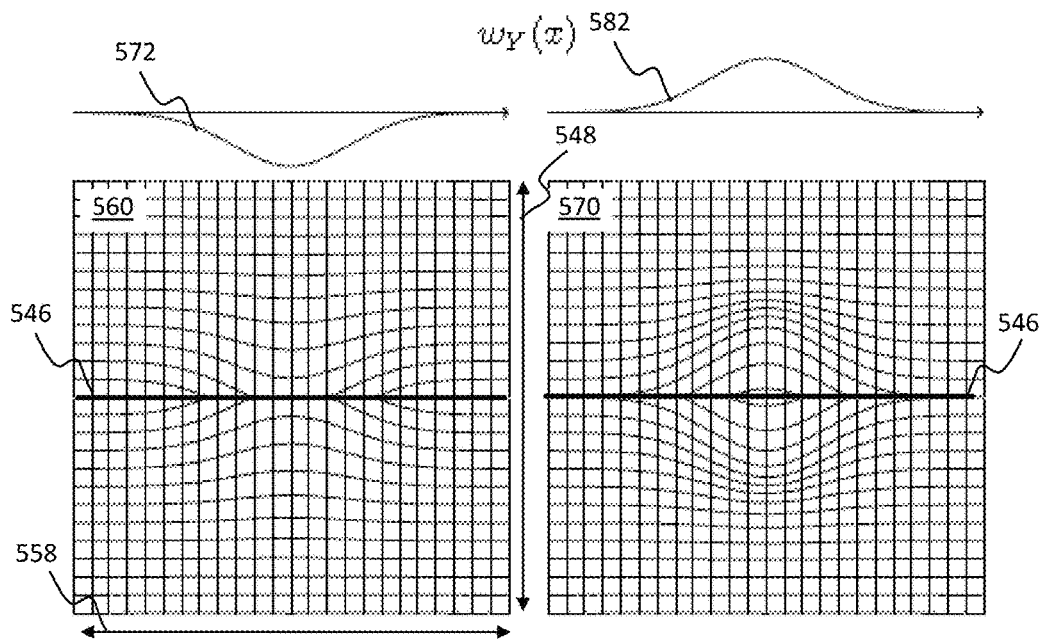

FIGS. 5B-5C illustrate image transformation operation for obtaining a composite image in accordance with one implementation. Panels 540, 550 in FIG. 5B depict two-dimensional longitudinal (e.g., horizontal) displacement along dimension 558 of a pixel in the source images. Line 546 may denote a boundary (e.g., iso-line) between two source images. The displacement information in panels 540, 550 may be configured based on disparity shown by curves 542, 552, respectively. Panels 560, 570 in FIG. 5C depict two-dimensional latitudinal (e.g., vertical displacement along dimension 548 of a pixel in the source images. The displacement information in panels 560, 570 may be configured based on disparity shown by curves 572, 582, respectively In some implementations, the transformation described with respect to FIGS. 5A-SC may comprise a symmetric warp component (e.g., $w_Y$) configured to be applied to source images on two sides of the iso line. As shown in FIG. 5B, $w_X(x)$ displacement may be configured in opposing directions with respect to the iso line 546. That is pixel displacement for pixels above the line 546 may be in opposing horizontal direction from pixel displacement below the iso line in FIG. 5B if disparity value is non zero. As shown in FIG. 5C, $w_Y(x)$ displacement may be configured in opposing directions with respect to the iso line 546. That is pixel displacement for pixels above the line 546 may be in opposing vertical direction from pixel displacement below the iso line in FIG. 5C if disparity value is non zero.

Various cost functions may be utilized in order to optimize image transformation (image warp). The optimization cost function may be configured based on image alignment metric. In some implementations, image alignment metric may be defined as a sum of squared differences of pixel values after colorimetric correction between overlapping portions of the source images, as follows:

$$f = f_{SSD} + f_{ss} + f_{ts} \quad \text{(Eqn. 4)}$$

where $f_{SSD}$ denotes sum of squared differences of pixel values (per channel) between pre-warped and post-warped image;

$f_{ss}$ denotes spatial smoothing operation; and $f_{ts}$ denotes temporal smoothing operation.

The sum of squared differences component may be determined for a pixel at x-coordinate as follows:

$$f_{SSD}((w_X(t,x))_x, (w_Y(t,x))_x) = \quad \text{(Eqn. 5)}$$
$$\sum_{x,c}\sum_{dx,dy} [\tilde{I}_2(t, x+dx-w_X(t,x), y_{iso}+dy-w_Y(t,x), c) - \tilde{I}_1(t, x+dx+w_X(t,x), y_{iso}+dy+w_Y(t,x), c)]$$

In some implementations, the warp transformation may be applied to grayscale source images (e.g., nbc=1). Transformation domain for Eqn. 5 may be selected as follows:

$$(dx,dy) \in \{-1,0,1\} \times \{-1,0,1\}, nbc=1 \quad \text{(Eqn. 6)}$$

Spatial smoothness component $f_{ss}$ of the cost function Eqn. 5 may be determined as follows, in some implementations:

$$f_{ss}((w_X(t,x))_x, (w_Y(t,x))_x) = \quad \text{(Eqn. 7)}$$
$$\sum_x \left[k_{sx}\frac{\Delta w_X}{\Delta x}(t,x)\right]^2 + \left[k_{sy}\frac{\Delta w_Y}{\Delta x}(t,x)\right]^2$$

Temporal smoothness component $f_{ts}$ of the cost function Eqn. 5 may be determined as follows, in some implementations:

$$f_{ts}((w_X(t,x))_x, (w_Y(t,x))_x) = \quad \text{(Eqn. 8)}$$
$$\sum_x \left[k_{tx}\frac{\Delta w_X}{\Delta x}(t,x)\right]^2 + \left[k_{ty}\frac{\Delta w_Y}{\Delta x}(t,x)\right]^2$$

Temporal smoothness of image transformation may be supported by using the camera motion information $\Delta w/\Delta t(t, x)$, e.g., orientation information R(t) between frames at time t and time t+1:

$$\frac{\Delta w}{\Delta t}(t,x) = w(t+1, x) - w(t, x) \rightarrow w(t+1, R_t(x)) - \omega(t, x) \quad \text{(Eqn. 9)}$$

In one or more implementations, the orientation information R(t) may be provided by an orientation sensor (e.g., gyroscope, accelerometer), and/or obtained by image displacement estimation using computer vision techniques, e.g., such as described in U.S. patent application Ser. No. 14/927,343, entitled "APPARATUS AND METHODS FOR ROLLING SHUTTER COMPENSATION FOR MULTI-CAMERA SYSTEMS", filed on 29 Oct. 2015, incorporates supra.

The use of camera rotation information may enable increase of the smoothing parameters $k_{tx}$ and/or $k_{ty}$ in Eqn. 7 and/or improve temporal stability of the warp optimization.

Cost function used for image transformation operation (e.g., such as described by Eqn. 5) may be characterized by non-convex response. In order to obtain a global minimum of the cost function, a successive graduated feature selection (graduated optimization) methodology may be applied. In some implementations, the graduated optimization may comprise determining the warp transformation at multiple scales from the greater scale to the smallest scale. Larger scales feature selection (optimization) may be obtained by smoothing the source images with a larger Gaussian kernel. As describe elsewhere herein, a smoothing kernel with a greater dimension (e.g., 61 pixel) may be applied during one step of warp transformation; subsequently a smoothing kernel with smaller dimension (e.g., 21 pixel) may be applied during a subsequent step of the warp transformation. In some implementations in order to reduce processing computational load and/or processing time, optimizations larger scales may be performed on a reduced grid compared to optimization at smaller scales. By way of an illustration, optimization for scales corresponding to the smoothing kernel of 61 and 21 pixel in size may be performed on a 10 times coarser grid (e.g., every 10×steps along the epipolar line) compared to optimization corresponding to the smoothing kernel of 3 pixels. When performing a scale-varying optimization the following adapted smoothness parameters of Eqn. 7 may be utilized:

$$\hat{k}_{sx} = \frac{k_{sx}}{\text{step\_x}}, \hat{k}_{sy} = \frac{k_{sy}}{\text{step\_y}}, \quad \text{(Eqn. 10)}$$

Spatial and/or temporal smoothness components $f_{ss}$, $f_{ts}$ may be obtained using spatial residual$_{ss}$ and/or temporal residual$_{ts}$ residual as follows:

$$\text{residual}_{ss} = k_s * (\text{disparity}(t,x) - \text{disparity}(t,x+dx)) \quad \text{(Eqn. 11)}$$

$$\text{residual}_{ts} = k_t * (\text{disparity}(t,x) - \text{disparity}(t+1,x)) \quad \text{(Eqn. 12)}$$

The spatial residual of Eqn. 11 may be used to obtain a residual value for a pair of neighboring pixels on the boundary line at locations x and x+dx. The temporal residual of Eqn. 11Eqn. 12 may be used to obtain a residual value for a pixel location between two frames at time t and t+dt. In some implementations, evaluation of Eqn. 12 may be performed for every frame in a video such that dt=1. In one or more implementations, the residuals of Eqn. 11, Eqn. 12 may be referred to as "spring constants" with $k_s$ and $k_t$ interpreted as spring stiffness parameters.

The sum of squared differences component of the cost function of Eqn. 5 may be determined using the following residual $$\text{residual}_{SSD}(dx,dy) = I_2(t,x+dx-w_x,y+dy-w_y) - I_1(t,x+dx+w_x,y+dy+w_y) \quad \text{(Eqn. 13)}$$

where
  range of displacement (dx,dy) may be determined in accordance with Eqn. 6; and
  $w_x$,y+dy+$w_y$ may be determined using Eqn. 2.
In some implementations, determination of disparity (e.g., using Eqn. 2) may provide an estimation of the depth within the overlapping portion between two source images.

Figure 6:
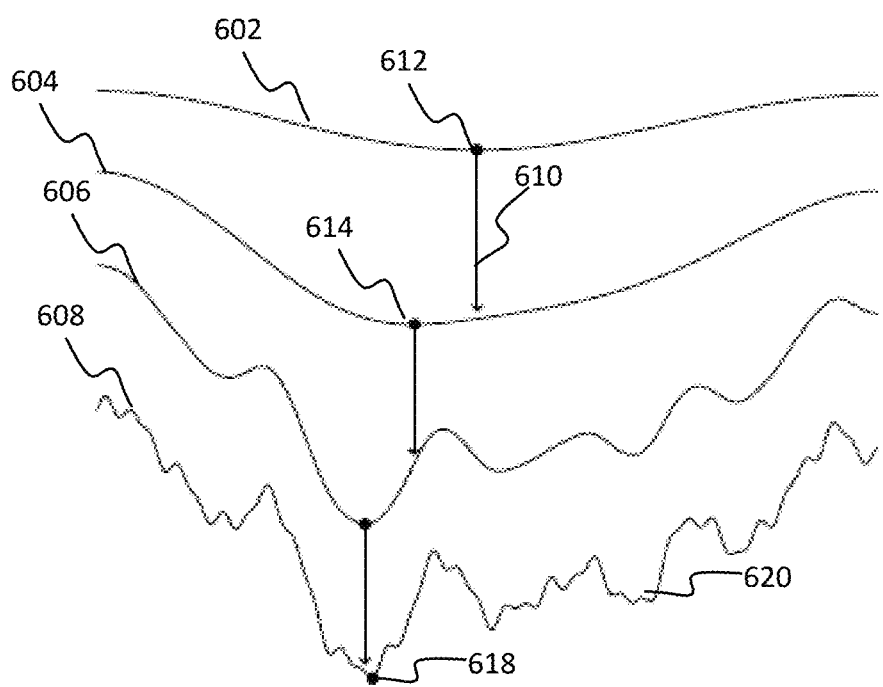
FIG. 6 is a plot depicting multiple scales of image transformation for obtaining a composite image in accordance with one implementation.

The components residual$_{ss}$, residual$_{ts}$, residual$_{SSD}$ may be utilized in order to obtain optimal solution (e.g., obtain global minimum 620 in FIG. 6). In some implementations, an optimizing process may be employed in order to obtain values of the disparity(t,x) such that to minimize values of residuals of Eqn. 11, Eqn. 12, Eqn. 13. In one or more implementations, an optimizer process from the Ceres Solver C++ library may be employed. The above cited optimizer process may be configured based on the "Levenberg Marquardt" algorithm.

FIG. 6 is a plot depicting multiple scales of image transformation cost function for obtaining a composite image in accordance with one implementation. Individual curves 602, 604, 606, 608 in FIG. 6 may correspond to cost function instances determined at increasing spatial scales as a function of disparity. That is, spatial scale associated with the curve 608 may be greater than the spatial scale associated with the curve 606, spatial scale associated with the curve 606 may be greater than the spatial scale associated with the curve 604, spatial scale associated with the curve 604 may be greater than the spatial scale associated with the curve 602. As may be seen from FIG. 6, greater scale cost function 602 may be used to obtain global minimum location 612 at this scale; cost function 604 may be used to obtain global minimum location 614 at this scale. Use of the cascaded multiscale optimization may enable determination of the global minimum (shown by location 618) of the cost function characterized by multiple local minima (e.g., denote by location 620)

In some implementations, the image warp (e.g., displacement of pixels) may be applied to pixels located at the iso line (e.g., pixel 450 on line 412 in FIG. 4). The resultant pixel displacement (pixel warp) may "propagated" in space to neighboring pixels within a given frame. In some implementations, the pixel warp may be propagated using a smoothing operation (e.g., spatial smoothing kernel such as Gaussian, cosine, triangular, and/or other smoothing kernel). In one or more implementations, the warp may be extrapolated (faded away) towards a center of respective lens (e.g., location 420 in FIG. 4A for image 434 and/or location 422 in FIG. 4A for image 432), as shown in FIG. 15, where height denotes source image vertical dimension H 403, 405 in FIGS. 4A-4B; and width denotes source image horizontal dimension W 402 in FIGS. 4A-4B.

Image transformation (warp) may be configured based on what may be referred to as the epipolar constraint. In some implementations, the epipolar constraint may comprise displacing a given pixel (pixel 410 in FIG. 4A) along direction (in image x-y plane) that is configured tangential (e.g., as shown by bold arrow 408 in FIG. 4A) to the epipolar line that may pass through the pixel (e.g., the line 426 in FIG. 4). The image transformation configured using the epipolar constraint may be configured as follows:

$$\vec{P} = \begin{bmatrix} -\cos(\theta') \cdot \sin(\alpha) \\ \sin(\theta') \\ \cos(\theta') \cdot \cos(\alpha) \end{bmatrix} \quad \text{(Eqn. 14)}$$

$$\vec{X} \begin{bmatrix} 0 \\ \cos(\theta) \\ -\sin(\theta) \end{bmatrix}$$

$$\vec{T} = \vec{P} \wedge \vec{X} = \begin{bmatrix} -\cos(\theta') \cdot \sin(\alpha) \\ \sin(\theta') \\ \cos(\theta') \cdot \cos(\alpha) \end{bmatrix} \wedge \begin{bmatrix} 0 \\ \cos(\theta) \\ -\sin(\theta) \end{bmatrix} = \quad \text{(Eqn. 15)}$$

$$\begin{bmatrix} -\sin(\theta') \cdot \sin(\theta) - \cos(\theta') \cdot \cos(\theta) \cdot \cos(\alpha) \\ \cdots \\ \cdots \end{bmatrix}$$

$$\theta = \arctan(z/y)$$
$$\theta' = \arctan(z'/y')$$

$$\begin{bmatrix} x' \\ y' \\ z' \end{bmatrix} = \begin{pmatrix} \cos\alpha & 0 & \sin\alpha \\ 0 & 1 & 0 \\ -\sin\alpha & 0 & \cos\alpha \end{pmatrix} * \begin{bmatrix} x=0 \\ y \\ z \end{bmatrix} \quad \text{(Eqn. 16)}$$

$$\theta' = \arctan(\cos(\alpha) \cdot z/y) \quad \text{(Eqn. 17)}$$
$$\theta'(\theta) = \arctan(\cos(\alpha) \cdot \tan(\theta))$$
$$\cos(e) = \vec{x} \cdot \vec{T} = -\sin(\theta') \cdot \sin(\theta) - \cos(\theta') \cdot \cos(\theta) \cdot \cos(\alpha) =$$
$$-\sin[\arctan(\cos(\alpha) \cdot \tan(\theta))] \cdot \sin(\theta) -$$
$$\cos(\arctan(\cos(\alpha) \cdot \tan(\theta))) \cdot \cos(\theta) \cdot \cos(\alpha)$$

where
  $\tilde{P}$ denotes vector normal to the current epipolar plane;
  $\vec{P}$ denotes vector from the center of the sphere to the current iso-line location; and
  $\tilde{T}$ denotes vector tangential to the sphere in current epipolar plane.

Image transformation operations (e.g., such as described with respect to FIGS. 1-6 and/or Eqn. 1 through Eqn. 17) may enable one to obtain a seamless stitch of two or more source images into a composite image. Various capture device implementations may be utilized for obtaining panoramic images e.g., such as shown and described with respect to FIG. 7, FIG. 8, and/or described in U.S. Patent Application Ser. No. 62/134,567, entitled "UNI BODY DUAL-LENS MOUNT FOR A SPHERICAL CAMERA", filed 18 Mar. 2015, and/or U.S. Provisional Patent Application Ser. No. 62/166,584, entitled "MULTI CAMERA MOUNT" filed on 26 May 2015, each of the foregoing being incorporated herein by reference in its entirety.

FIG. 7 illustrates an exemplary multi-camera system configured for image acquisition in accordance with one implementation. The system 700 may comprise two or more capture devices, e.g., devices 702, 704, 706 in FIG. 7. Individual capture devices (e.g., 702) may comprise a video camera device, such as described in, e.g., U.S. patent application Ser. No. 14/920,427 Entitled "APPARATUS AND METHODS FOR EMBEDDING METADATA INTO VIDEO STREAM" filed on 22 Oct. 2015, the foregoing being incorporated herein by reference in its entirety. Individual capture devices may comprise an image sensor (e.g., CMOS sensor) characterized by a dimension and a resolution (in pixels). In some implementations, image sensor resolution may be configured between 4096 pixels by 2160 pixels and 848×480 pixels. Image refresh rate (e.g., frame rate) may be selected between 240 fps and 0.1 fps. It will be appreciated by those skilled in the arts that the above numbers are exemplary and various image resolution and/or refresh parameters may be utilized, e.g., 4 k (3840 pixel by 2160 pixel) images refreshed at 25 fps, 30 fps, 2.7 k (2716 pixel by 1524 pixel) at 25 fps, 30 fps, 60 fps, 1920 pixel by 1440 pixel refreshed at 25, 30, 50, 60, 80 fps, 1920×1080 at 120/90/60/30 fps, 1280×960 at 50, 60, 100, 12060 fps, 1280×720 at 240/120/60/30 fps and/or other configurations. Individual capture devices (e.g., 702, 704, 706) may be characterized by a given field of view. Capture devices may be arranged in a variety of spatial configurations, (e.g., in a given plane such as shown in FIG. 4 of U.S. Provisional Patent Application Ser. No. 62/166,584, entitled "MULTI CAMERA MOUNT" filed on 26 May 2015", incorporated supra), multiple planes, e.g., as illustrated in FIG. 8, below), and/or other capture devices spatial configurations.

The system 700 may comprise an array bus component 710 configured to couple individual cameras 702, 704, 706 to a control component 720. In some implementation, the bus component 730 may comprise one or more bus interfaces 712 implemented using HERObus protocol, e.g., such as described in U.S. patent application Ser. No. 14/885,990, entitled "CONFIGURABLE INPUT/OUTPUT CONNECTOR IN A CAMERA", filed 16 Oct. 2015, the foregoing being incorporated herein by reference in its entirety.

The system 700 may comprise telemetry component 730. The component 730 may comprise one or more sensors and/or sensor interfaces configured to provide information related to image acquisition by the system 700. In some implementations, the telemetry component 730 may include an inertial measurement unit comprising an acceleration sensor and/or rate of rotation sensor, global positioning system (GPS) receiver component (not shown). LiDAR sensor, structured light sensor, and/or other sensor component. In one or more implementations, telemetry component 730 may comprise an interface to an external sensor (e.g., heart rate monitor, cadence sensor, and/or other sensor). In some implementations, the telemetry component may comprise a Micro-electro-mechanical systems (MEMS) solid state gyroscope configured to provide three components (x,y,z) of rate of rotation and three components (x,y,z) of acceleration information.

Telemetry component 730 may provide data related to position and/or orientation of the system 700 during image acquisition. In some implementation, orientation information may be provided at a rate selected between 1 Hz and 10,000 Hz in order to facilitate rolling shutter correction. In some implementations, the rolling shutter correction may be implemented using methodology described U.S. patent application Ser. No. 14/927,343, entitled "APPARATUS AND METHODS FOR ROLLING SHUTTER COMPENSATION FOR MULTI-CAMERA SYSTEMS", filed on 29 Oct. 2015, the foregoing being incorporated herein by reference in its entirety.

The system 700 may comprise a plurality of interface components, such as time code interface 746, microphone array interface 744, radio frequency (RF) interface, 742, a USB hub 754 and a host system interface 740. The time code interface may be configured to set system time from a known source of time, e.g., mobile application, desktop computer, GPS receiver, a GoPro BacPac device, a network entity, the Internet, and/or another source. In some implementations, the component 746 may be adapted to provide a timing indication 722 (e.g., a signal alternating between two logic levels, e.g., zero and one) configured to enable synchronous image capture by two or more capture devices (e.g., 702, 704, 706). The RF interface 742 may be configured to communicate one or more remote control instructions to the camera array via the array controller 756. In some implementations, the remote control commands may include on, off, start capture, pause capture, change image resolution, change image frame rate, highlight tag, and/or other indications.

The microphone array interface 744 may be configure to communicate information related to audio signal acquisition by the system 700. In one or more implementations, audio may be captured and/or encoded independently by individual capture device (e.g., 702, 704, 706). In some implementation the component 744 may interface to and/or provide audio input from one or more external microphones into the system 700. When external microphones may be used, the component 744 may communicate synchronization information configured to enable audio-video synchronization and/or audio synchronization between external and internal (e.g., built into the capture device 702, 704, 706) audio sources.

The host system interface 740 and the USB hub 754 may enable interface and/or data communication between an external entity (e.g., desktop, tablet, laptop computer, a smartphone, USB hub, and/or another computing device) and one or more capture device (702, 704, 706). The host system interface 740 and the USB hub 754 may enable offload of content captured by one or more capture devices USB when connected to an external USB hub and/or computer. In some implementations, captured content may be offloaded via removal of the SD cards from one or more capture device(s).

The system 700 may comprise a system control component 720 configured to communicate timing information 722 microphone control information 724, remote control information 726, and/or file transfer information 728 between respective interface components 746, 744, 742, 740 and the array controller 756, array timing 758, and/or USB hub, respectively. In some implementations, the control component 720 may comprise a printed circuit board, an FPGA, an ASIC, a SOC and/or other component.

The system 700 may further include power interface 734 coupled to power component 752 and the board supply component 732. In some implementations, the power component 752 may comprise energy source configured to provide power to one or more components of the system 700 (e.g., capture devices 702, 704, 706 via, e.g., bus interface 712, control component 720 and/or other components. The energy source may comprise any applicable source including but not limited to a direct current, an alternating current source, Da mechanical coupling, energy accumulator (ethical capacitor) and/or mechanical (e.g., a flywheel, a wind-up module), wireless charger, radioisotope thermoelectric generator, thermocouple, piezo-generator, a dynamo generator, a fuel cell, an internal or external combustion engine, a pneumatic, a hydraulic, and/or other energy source. In some implementations wherein the component 752 may comprise a rechargeable energy source (e.g., Switronix Hypercore-98S rechargeable 12 V battery component, 6.6 Ah, 14.8 V 98 Wh), the battery may be recharged from an external source via the interface 734. In one or more implementations, the system 700 may include energy management component configured to, implement a battery "spoofing" function so that the component 752 battery may be used for extended run-time. "Spoof" in this context may means running the camera array from the external power source without drawing power from the batteries of individual capture devices 702, 704, 706.

FIG. 8 depicts an exemplary 6-camera imaging apparatus in cube-shaped cage in accordance with one implementation. The cage 820 dimensions may be selected between 25 mm and 150 mm, preferably 105 mm in some implementations. The cage 820 may be outfitted with a mounting port 822 configured to enable attachment of the camera to a supporting structure (e.g., tripod, photo stick). The apparatus 800 may comprise six capture devices, e.g., cameras 802, 804, 806 visible in FIG. 8. Individual capture devices (e.g., 802) may comprise a video camera device, such as described in, e.g., such as described in U.S. patent application Ser. No. 14/920,427 entitled "APPARATUS AND METHODS FOR EMBEDDING METADATA INTO VIDEO STREAM" filed on 22 Oct. 2015, the foregoing being incorporated herein by reference in its entirety.

Individual cameras (e.g., 802, 804, 806) may be disposed in a rigid structure, e.g., cube-shaped cage 838 shown in FIG. 8. Use of a rigid structure may ensure that orientation of individual cameras with respect to one another may remain at a given configuration during operation of the apparatus 800.

Individual cameras (e.g., 802, 804, 806) may be characterized by field of view 120° in longitudinal dimension (e.g., dimension denoted by arrow 812) and 90° in latitudinal dimension (e.g., dimension denoted by arrow 814). In order to provide for an increased overlap between images obtained with adjacent cameras, image sensors of any two adjacent cameras may be configured at 90° with respect to one another. By way non-limiting illustration, longitudinal dimension 812 of camera 802 sensor may be oriented at 90° with respect to longitudinal dimension 816 of the camera 804 sensor; longitudinal dimension 818 of camera 806 sensor may be oriented at 90° with respect to longitudinal dimension 816 of the camera 804 sensor. Camera sensor configuration illustrated in FIG. 8, may provide for 420° angular coverage in vertical and/or horizontal planes. Overlap between fields of view of adjacent cameras may provide for an improved alignment and/or stitching of multiple source images to produce, e.g., a panoramic image, particularly when source images may be obtained with a moving capture device (e.g., rotating camera).

Individual cameras of the system 800 may comprise a lens e.g., lens 830 of the camera 802. In some implementations, the individual lens may be characterized by what is referred to as fisheye pattern and produce images characterized by fish eye (or near-fish eye) field of view (FOV), e.g., images 1000, 1010 shown in FIGS. 10A-10B. Images captured by two or more individual cameras of the system 800 may be combined using stitching of fisheye projections of captured images to produce equirectangular planar image, e.g., the frame 1020 shown in FIG. 10C.

Image transformation operations (e.g., such as described with respect to FIGS. 1-6, Eqn. 1 through Eqn. 17, and/or FIGS. 11-12) may be effectuated by a processing component. In some implementations, the processing component may be embedded within the capture device (e.g., 700 and/or 800) and/or comprise an external (with respect to the capture device) entity.

Figure 9:
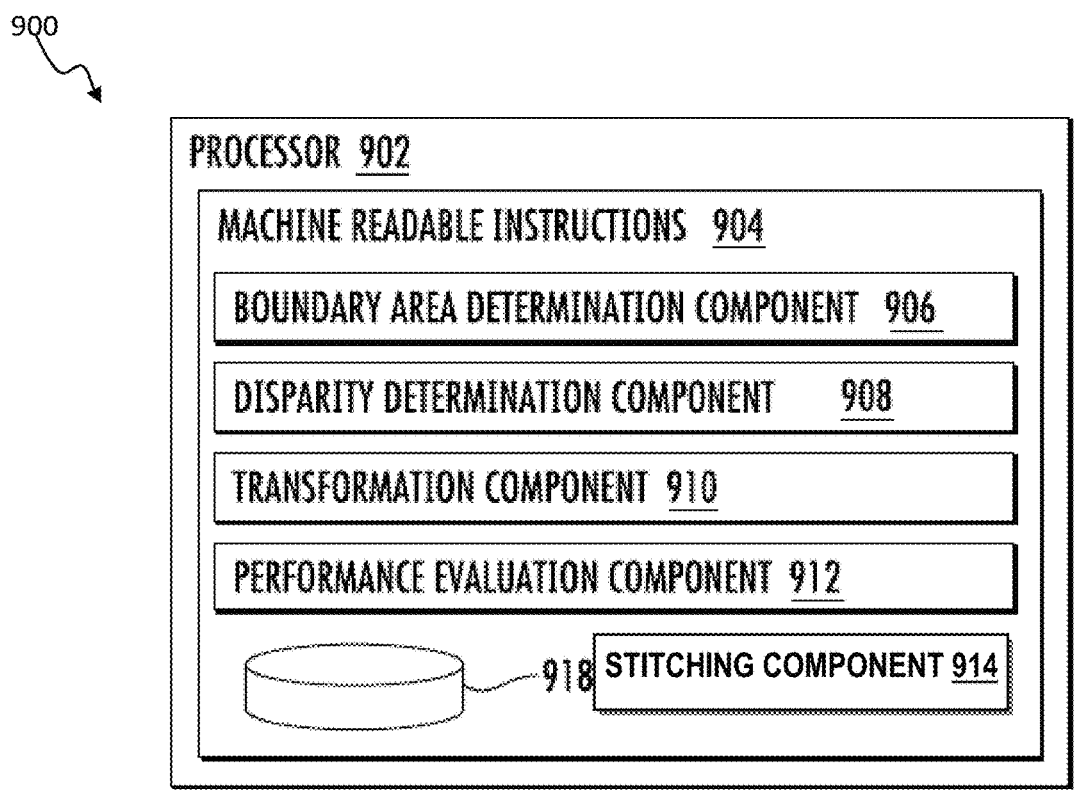
FIG. 9 is a functional block diagram illustrating an exemplary system configured for implementing image transformation methodology for obtaining a composite image in accordance with one implementation.

FIG. 9 illustrates an exemplary system configured for implementing image transformation operations for obtaining composite images in accordance with one implementation of the present disclosure. The system 900 may comprise one or more physical processors 902 configured by machine-readable instructions 904 and/or other components. The processor component 902 may comprise one or more of a CPU, DSP, GPU, ASIC, SoC, FPGA, and/or other processing components. The processor 902 may be embodied within a camera system (e.g., 700 in FIG. 7), mobile device (e.g., smartphone), a computer (e.g., laptop, desktop, tablet, and/or other computer), embedded computer, a server, and/or other computing platform. In some implementations, the processor component 902 may be effectuated using a cloud computing service (e.g., Amazon elastic computing cloud EC2) and/or other computing service.

Executing the machine-readable instructions 904 may cause the one or more physical processors 902 implement rolling shutter methodology of the disclosure. The machine-readable instructions 904 may include one or more of a boundary region determination (abbreviated boundary determination component 906 in FIG. 9), disparity determination component 908, image transformation component (abbreviated transformation component 910 in FIG. 9), performance evaluation component 912, and composite image determination component (abbreviated stitching component 914 in FIG. 9).

The system 900 may comprise an electronic storage component 918. The component 918 may comprise any applicable storage medium (e.g., optical, magnetic, flash memory, RAM, ROM, and/or other storage technology. In some implementations, e.g., such as shown and described with respect to FIG. 7-8, the storage component 918 may comprise multiple physical storage elements (e.g., flash memory of individual capture devices 702, 704, 706 in FIG. 7). The component 918 may be configured to store multiple source images and/or transformed images.

One or more features and/or functions of system 900 may be configured to facilitate generation, editing, and/or distribution of videos comprised of one or more composite images. It is noted that although the present disclosure is directed to videos and/or video clips, one or more other implementations of system 900 may be configured for other types of information. By way of non-limiting example, other types of information items may include one or more of image filed obtained using pressure waves (e.g., ultrasonic imaging, geophysical imaging), x-ray imaging, magnetic resonance imaging, and/or other applications wherein two or more digital images may be combined to produce a composite image.

Figure 10D:
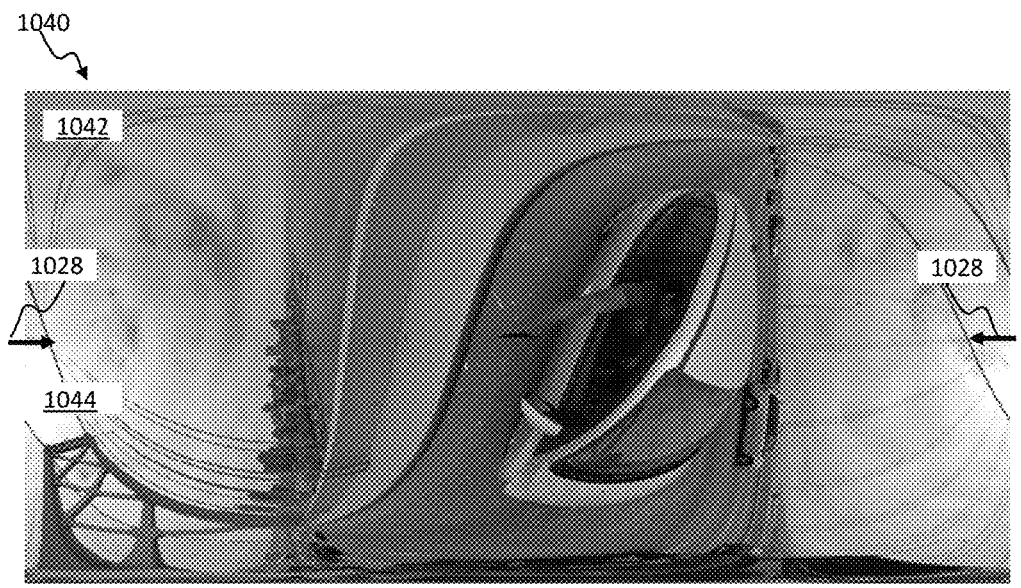

The transformation component 910 may be configured to implement image combination and/or image transformation operations to obtain a composite (panoramic) image, e.g., as the image shown in FIG. 10D.

The boundary region determination component 906 may be configured to determine a boundary region separating two or more source images. In some implementations, the boundary region may comprise multiple pixels disposed along a curve disposed between lens optical centers (e.g., iso lines 112, 132 in FIG. 1.

The disparity determination component 908 may be configured to determine disparity measure for pixels located in the boundary region and corresponding to individual images. In some implementations, the disparity measure may be determined based on evaluation of pixel values of an image obtained with one component of a capture device (e.g., image 1022 in frame 1020 obtained with the lens characterized by the field of view 100 in FIG. 1) and an image obtained with another component of the capture device (e.g., image 1024 of frame 1020 obtained with another lens of the capture device characterized by lens field of view 120 in FIG. 1). In one or more implementations, the disparity may be determined based difference of pixels of color-corrected spatially smoothed source images in the overlap region between two images.

The image transformation component 910 may be configured to apply warp transformation. In some implementations, the transformation operation may comprise operations described with respect to FIGS. 5A-5C and/or Eqn. 1-Eqn. 17. In one or more implementations, the transformation operation may comprise determining an optimized warp transformation for pixels of the iso-line. The residuals residual_ss, residual_ts and residual_ssd fully define our optimization. The optimization process may be employed to obtain the values of disparity(t,x) to make these residuals as close as possible to zero. The remaining pixels of the overlap region may be transformed using the epipolar constraint.

Performance evaluation component 912 may be configured to implement image transformation performance estimation operations. Performance evaluation component may be configured to provide an estimate of transformation performance when two or more source images may be combined to produce a panoramic image. In some implementation, operation of the component 912 may include operations described with respect to Eqn. 11, Eqn. 12, Eqn. 13. In one or more implementations, the performance evaluation may comprise determination of a sum of squared differences of pixels values in the overlap region between two images.

Stitching component 914 may be configured to obtain a composite frame (e.g., the frame 1040 shown in FIG. 10D) based on output of the image transformation of the source images by component 910. Composite frame generation may comprise rolling shutter correction operations, e.g., such as described in U.S. patent application Ser. No. 14/927,343, entitled "APPARATUS AND METHODS FOR ROLLING SHUTTER COMPENSATION FOR MULTI-CAMERA SYSTEMS", filed on 29 Oct. 2015, incorporated supra.

FIGS. 10A-10D present digital images obtained by Assignee thereof illustrating image transformation methodology in accordance with one implementation of the disclosure. Images 1000, 1010 in FIGS. 10A-10B may be obtained by a capture device comprising two lenses and two imaging sensors. The lenses of the capture device may be characterized by (near) fisheye lens pattern configured to capture 180°×180° or greater field of view. The lenses of the capture device may be disposed to view opposing hemispheres of the visual field (e.g., as illustrated in FIGS. 1-2). In some implementations, the images 1000, 1010 may be obtained using the capture device 800 of FIG. 8 and/or dual lens capture device described in U.S. Patent Application Ser. No. 62/134,567, entitled "UNI BODY DUAL-LENS MOUNT FOR A SPHERICAL CAMERA", filed 18 Mar. 2015, incorporated supra.

FIG. 10C illustrates a frame 1020 comprised of two source images 1000, 1010 shown in FIGS. 10A-10B and transformed into equirectangular plane, e.g., as described above with respect to FIGS. 4A-4B. The frame 1020 may be characterized by a longitudinal dimension 1030 of 2048 pixels and latitudinal dimension 1032 of 1024 pixels. The frame 1020 may be comprised of the images 1022, 1024 obtained based on equirectangular projection of images 1000, 1010 of FIGS. 10-10C, respectively. The frame 1020 presents source images combined without application of image warp transformation. A mismatch between the image 1022 and image 1024 may be seen in FIG. 10C, particularly at the image border at half height (denoted by arrows 1028) in the frame 1020. Instances of image mismatch in FIG. 10C are highlighted by arrows 1026.

FIG. 10D presents a frame 1040 obtained based on the image warp transformation of the disclosure. The frame 1040 is comprised of two source images 1000, 1010 that have been transformed into the equirectangular plane and subjected to the warp transformation, e.g., such as described with respect to FIGS. 1-6 and/or Eqn. 1 through Eqn. 17. The transformed images are shown in panels 1042, 1044 in FIG. 10D. In the implementation illustrated in FIG. 10D, the frame 1040 may be characterized by a longitudinal dimension of 2048 pixels and latitudinal dimension of 1024 pixels. Individual transformed images 1042, 1044 may share a common border region denoted by arrows 1028. In the implementation shown in FIG. 10D, the border region may correspond to the iso-line and may comprise 1 pixel by 2048 pixel region. As may be seen in FIG. 10D, the transformed image 1042 matches the transformed image 1044 along the border region (denoted by arrows 1028). The source images may overlap. In the implementation illustrated in FIGS. 10C-10D the overlap region may be configured about 200 pixel in height (e.g., indicated by arrow 1036 in FIG. 10C) and 2048 pixels in width. In some implementations, in order to reduce computational load, the warp optimization process may be applied to the border region (e.g., 1×2048 pixels). In some implementations, maximum value of the disparity may be subject to a constrained, e.g., limited to a value of 80 pixels. Such constraint may enable image alignment wherein objects in close proximity to the camera may remain misaligned while alignment of the remainder of the image may be improved. The outcome of the warp optimization may be applied (propagated across) to the remainder of the overlap region using appropriate methodologies, including but not limited to those described herein.

Overlapping portions of the transformed source images may be combined with one another in order to produce the composite frame. In some implementations, the combination may be effectuated via a blend operation wherein a value of a pixel at a given location within the overlap portion of the combined frame is being obtained based on a combination of pixel values from two (or more) source images at the given location. By way of an illustration, value of pixel Ic 450 in FIG. 4B may be determined as:

$$Ic(x,chn)=0.5I_1(x,chn)+0.5I_2(x,chn); \qquad (\text{Eqn.18})$$

where x denotes longitudinal coordinate along the boundary between two images I1, I2 (e.g., 452 in FIG. 4B), and chn denotes the color channel. For pixels disposed further away from the boundary (e.g., pixel 456 in FIG. 4B) the blend ratio may be adjusted based on distance 458 from the boundary using a linear and/or non-linear operation (e.g., contribution from pixels of the image 432 may be progressively decreased (e.g., linearly) with an increase of distance 458. It will be appreciated by those skilled in the arts that various other blend implementations may be utilized, e.g., nonlinear, with constraint (e.g., source value within a given range), end/or other implementations of pixel combination.

Figure 11A:
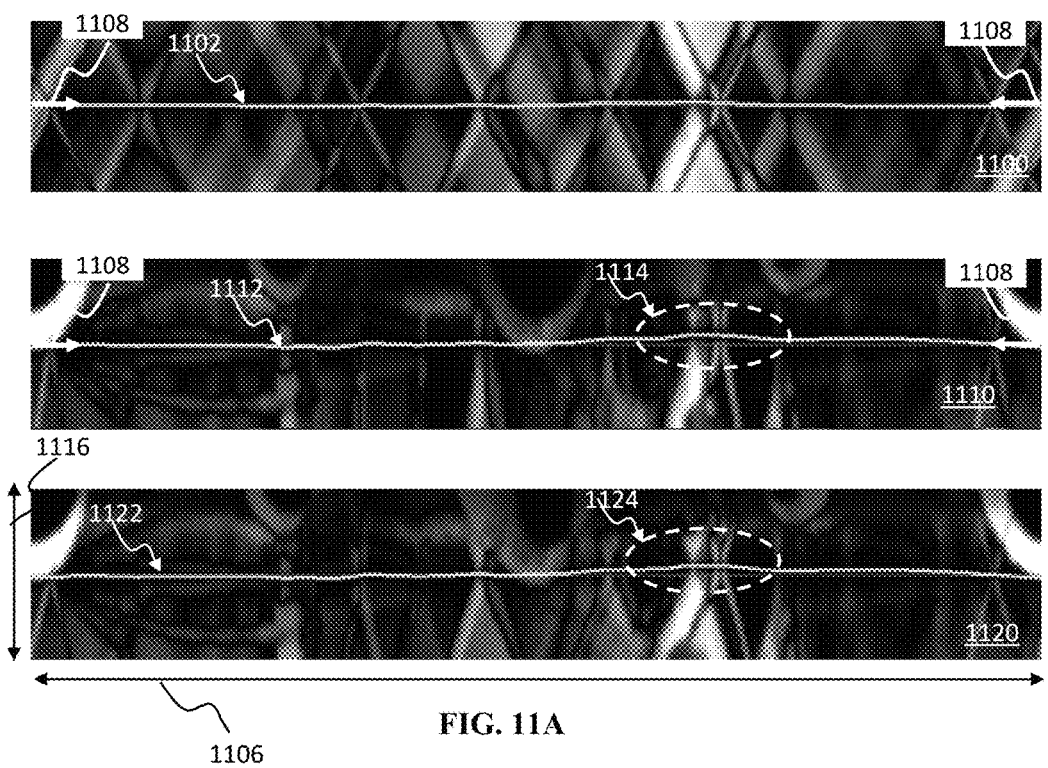
FIG. 11A illustrates cost function used for transforming images, in accordance with some implementations.
Figure 11B:
FIGS. 11B-11C presents overlap portion of a frame prior and subsequent to image transformation, in accordance with some implementations.

FIG. 11A illustrates a cost function used for transforming image of FIG. 11B, in accordance with some implementations. Panels 1100, 1110 in FIG. 11A present x,y components of pixel displacement $w_X(t, x)$, $w_Y(t, x)$, determined, e.g., using Eqn. 1-Eqn. 2; panel 1120 presents disparity determined, e.g. using Eqn. 3. Panels 1100, 1110, 1120 present portions of the frame corresponding to an area of overlap between two source images (e.g., the images 1022, 1024 in FIG. 10C); arrows 1108 in FIG. 11A denote the border between the two source images (the iso line). Curves 1112, 1122 denote disparity at the iso line. Curves 1114 and 1124 denote region of the respective disparity corresponding to the area 1134 in FIG. 11B. Individual panels 1100, 1110, 1120 may be characterized by longitudinal 1106 dimension of 1024 pixels and latitudinal dimension 1116 of 170 pixels. Information in panel 1110 is characterized by a high degree of similarity to information of panel 1120 due to, inter alia, almost vertical orientation of epipolar lines in this instance.

Figure 11C:
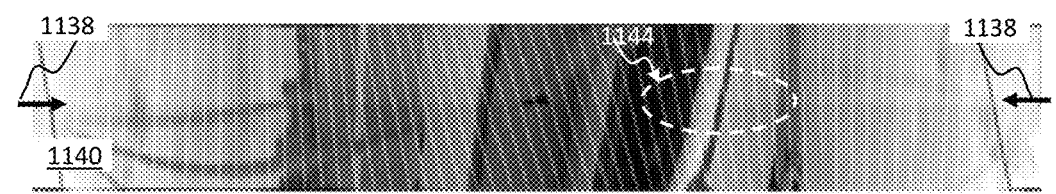

FIGS. 11B-11C depicts the portion of the frame corresponding to the area of overlap between the source images. Arrows 1138 in FIG. 11B, 11C denote the border between the two source images (the iso line). Panel 1130 in FIG. 11B depicts the frame prior to the warp transformation. Curve 1134 denotes portion of the frame characterized by mismatch and/or misalignment between source images. Slanted thin lines (e.g., 1132) in FIGS. 11B-11C denote the epipolar lines (e.g., 426, 428 in FIG. 4A). Panel 1140 in FIG. 11C depicts the frame configured based on the warp transformation of the disclosure. Portion of the panel 1140 denoted by curve 1144 illustrates that source images are characterized by a better degree of image match compared to the area 1134 in the frame obtained in absence of the warp transformation. The better match may be characterized, e.g., by a reduced sum of squared differences between pixel values from the two images within the border area (e.g., the iso line 1138).

In some implementations, the combined frame may be obtained using a blend operation wherein a value of a pixel at a given location within the overlap portion of the combined frame is being obtained based on a combination of pixel values from two (or more) source images at the given location.

Various computational platforms may be utilized for implementing image transformation methodology described herein. In some implementations, image transformation may be effectuated using a processor of the capture device (e.g., camera apparatus 800 of FIG. 8). In one or more implementations, image transformation may be performed by a computing entity external from the capture device, e.g., desktop computer, portable computer, processing cloud, special purpose processor (e.g., SoC, GPU, ASIC) and/or another processing entity. Image transformation performed by the Assignee thereof and described with respect to FIGS. 10A-12B was performed using executable instructions processed by a CPU component of a computing device, e.g., Dell XPS 8500 equipped with an octo-core Intel Core i7 processor. In one implementation of color correction and the warp optimizations Ceres Solver was utilized; ALGLIB was used for performing bi-cubic interpolation; OpenCV for was used to apply Gaussian blur to source images.

Image transformations of the disclosure may be obtained using the following processing parameters:

the width of the working projection may be selected at 2000 pixels (e.g., dimension 402 in FIG. 4B);

Gaussian blur kernel size (in pixels) for producing the 3 scales may be selected at 61 pixels, 21 pixel, and 3 pixels;

Spatial smoothing parameters (ksx, ksy) of Eqn. 7 may be selected as follows: ksx=1, ksy=0.5;

Temporal smoothing parameters (ktx, kty) of Eqn. 8 may be selected as follows: ktx=0.08, kty=0.02;

computation of fSSD (e.g., using Eqn. 5, Eqn. 6) may be performed over the spatial extent configured as follows dx, dy∈2 {−2, 0, 2};

Above values are exemplary and may be determined using an optimization process for a given image content.

In some implementations of multiscale image transformation source images may be spatially smoothed with multiple Gaussian blur kernels (e.g., 3 scales may be selected at 61 pixels, 21 pixel, and 3 pixels). In one or more implementations a portion of the source image(s), e.g., region of overlap (e.g., region 418 in FIGS. 4A-4B, region shown by panels 1130, 1140 in FIGS. 11B-11C) may be subject to the smoothing operation. By way of an illustration, for a region with dimensions of 2000 pixels by 170 pixels, individual smoothing operation may take about 17 ms when utilizing code executed by the octo-core Intel Core i7 processor of Dell XPS 8500 computer.

Figure 12A:
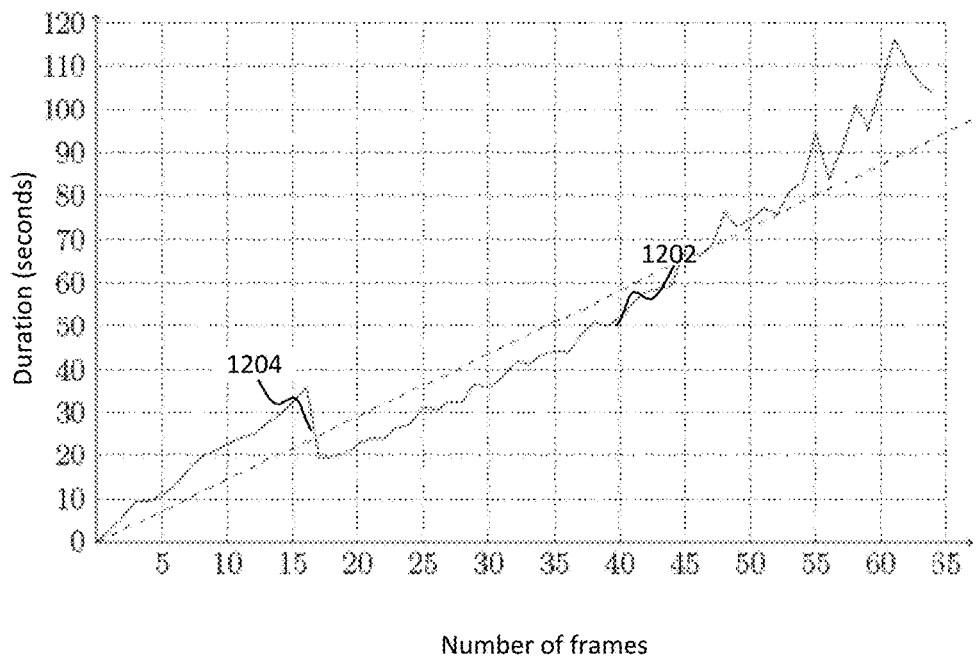
FIGS. 12A-12B presents data illustrating timing information related to image transformation, in accordance with some implementations.

FIG. 12A illustrates optimization duration as a function of number of frames. The optimization at a lower scale (e.g., the 3 pixel smoothing kernel) may require more time compared to optimization at a greater scale (e.g., the 21 pixel smoothing kernel). Curve 1204 denotes optimization duration for a given number of frames; broken line 1202 indicates a linear fit with the slope of 1.5 seconds per frame. As may be seen from FIG. 12A, from a certain number of) e.g., frames, they are optimized by (overlapping) groups of limited size to fit in memory, thus, the progression keeps linear. The two upper scales optimizations (21 pixel, and 61 pixel) may be performed about 10 times faster (compared to 3-pixel scale optimization), as the former are performed on fewer pixel locations. In some implementations, given the smoothness of the optimization solutions wX(t, x) and wY (t, x), image frames may be optimized over an area that may be selected smaller (e.g., by factor of 2-4) than the full frame width of 2000 pixels.

Figure 12B:
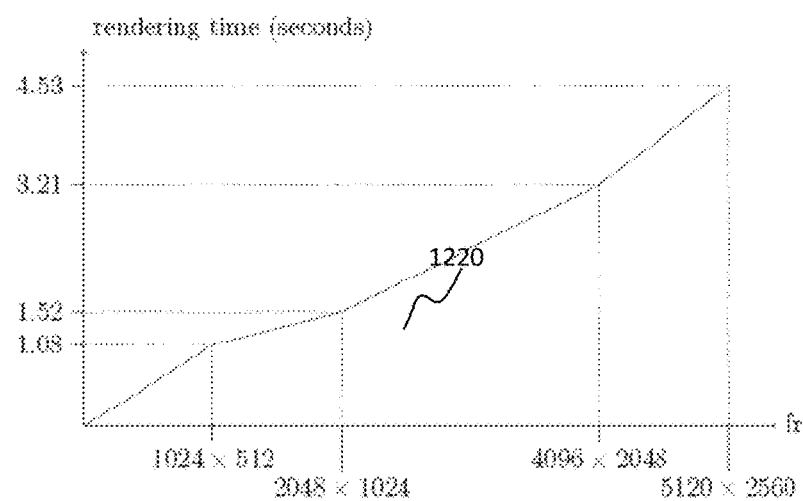

In FIG. 12B, curve 1220 represents rendering time in seconds for a number of frame sizes. The rendering duration information of FIG. 12B includes the PNG compression and file writing. In some implementations, wherein a GPU may be utilized for rendering, the rendering time may be reduced by, a factor between 15 and 30, compared to CPU-based implementations.

In some implementations, a derivative approach may be used for image transformation. By way of an illustration, a color gradient source image may be utilized in addition to and/or in lieu of the source image.

In some implementations, wherein one or more source images may be subject to lens flare, the flare may locally modify color and/or edge of one or more source images. A threshold over $f_{SSD}$ may be used to identify portions of the source image(s) that may be subject to flare.

In one or more implementations, one or more source images may comprise areas of contrast values that may be lower than contrast of other portions of the image (e.g., ground vs. hand and/or building. In some implementations, limiting the warp transformation at the nadir (where it tends to be very strong because the hand is very close) and/or using local contrast normalization may be utilized in order to improve image transformation in presence of low contrast.

In some applications capture device used to obtain source images (e.g., 1000, 1010 in FIGS. 10A-10B) may change orientation (e.g., rotate) between acquiring successive frames. Capture device orientation information may be utilized when determining temporal smoothing parameters of, e.g., Eqn. 9. In some implementations, rotation of the capture device may be obtained based on information provided by a motion sensor (e.g., a global positioning system (GPS) apparatus, an inertial measurement unit (IMU), and/or other sensor) and/or analysis of consecutive images, e.g., such as described in in U.S. patent application Ser. No. 14/927,343, entitled "APPARATUS AND METHODS FOR ROLLING SHUTTER COMPENSATION FOR MULTI-CAMERA SYSTEMS", filed on 29 Oct. 2015, the foregoing being incorporated herein by reference in its entirety.

It will be appreciate by those skilled in the art that the values shown and described herein represent examples aimed at illustrating principles of the disclosure and other image dimensions, image representations, overlap region dimension, warp solution region, and/or other parameters may be utilized.

Figure 13:
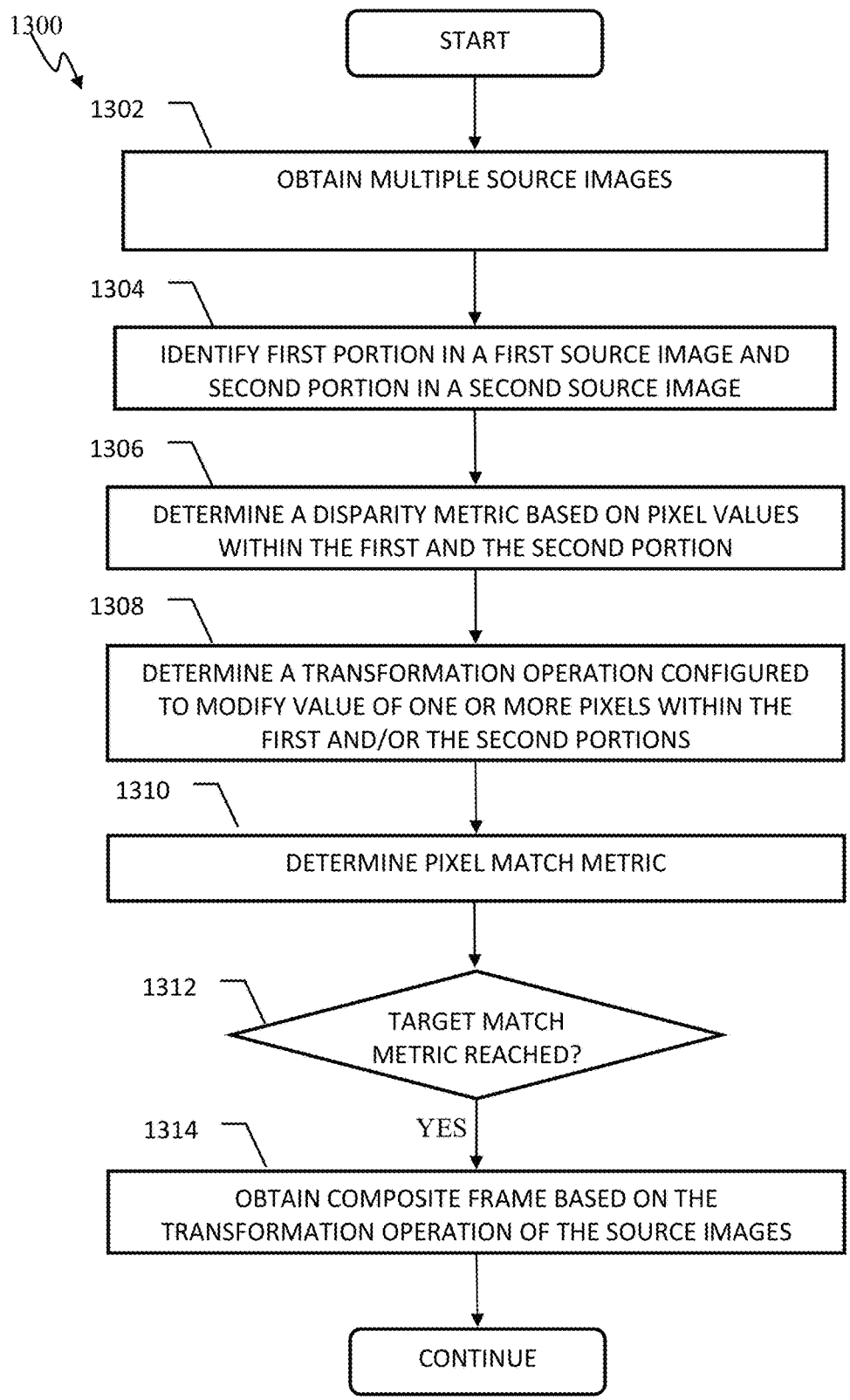
FIG. 13 is a logical flow diagram illustrating a method of obtaining a composite panoramic image from multiple source images, in accordance with some implementations.
Figure 14:
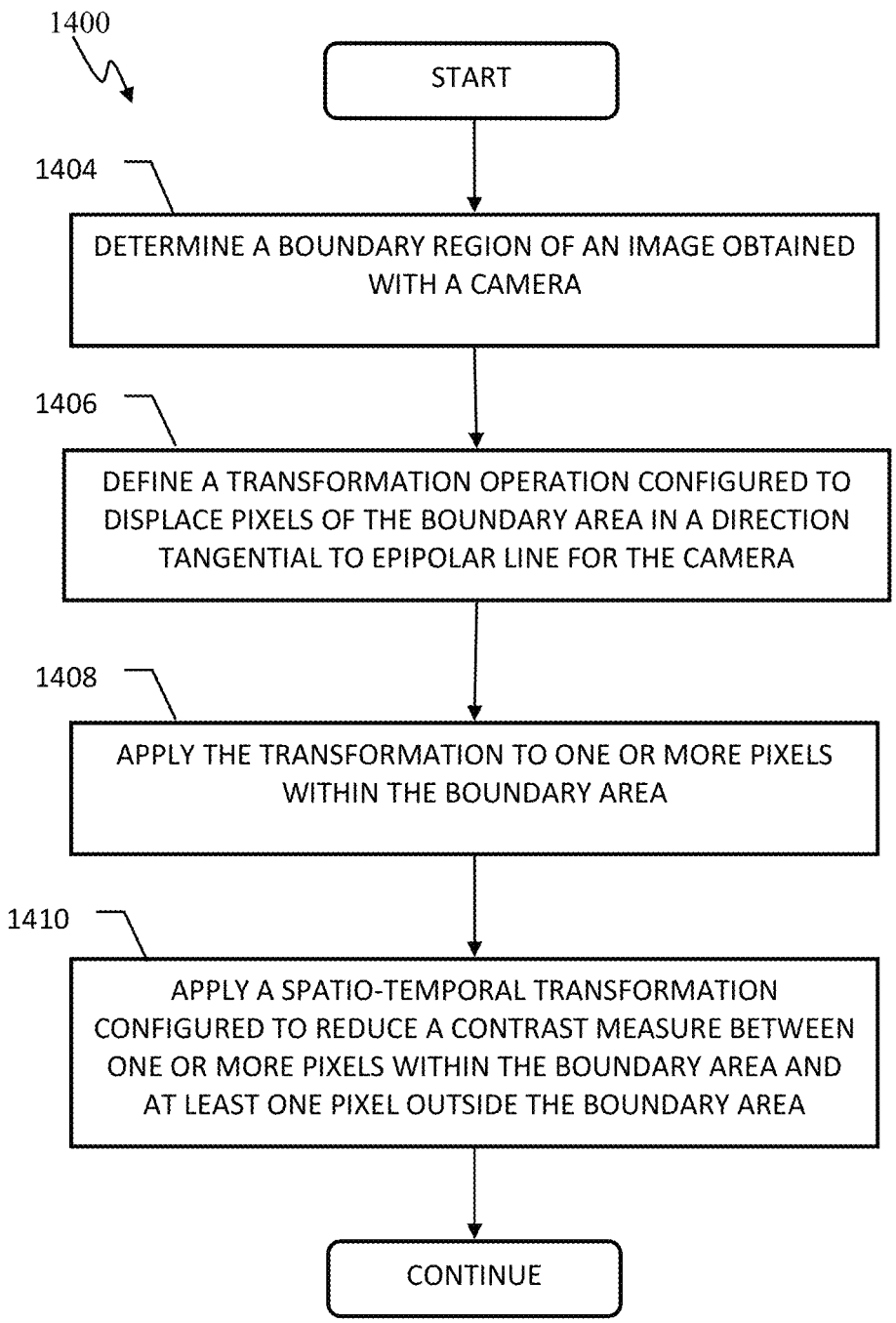
FIG. 14 is a logical flow diagram illustrating a method for pixel alignment along a border region between two images, in accordance with some implementations.

FIGS. 13-14 illustrate exemplary methods 1300, 1400 for image transformation to obtain panoramic composite image in accordance with some implementations. The operations of methods 1300, 1400 presented below are intended to be illustrative. In some implementations, method 1300, 1400 may be accomplished with one or more additional operations not described, and/or without one or more of the operations discussed. Additionally, the order in which the operations of method 1300, 1400 are illustrated in FIGS. 13-14 and described below is not intended to be limiting.

In some implementations, methods 1300, 1400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 1300, 1400 in response to instructions stored electronically on an electronic storage medium. The one or more processing devices may include one or more devices configured through hardware, firmware, and/or software to be specifically designed for execution of one or more of the operations of methods 1300, 1400.

FIG. 13 illustrates a method of obtaining a composite panoramic image from multiple source images, in accordance with some implementations.

At operation 1302 of method 1300, multiple source images may be obtained. Individual source images may be obtained with a camera apparatus comprising two or more image sensors (e.g., apparatus 700 of FIG. 7 and/or 800 of FIG. 8). In one implementation, the multiple source images may comprise a pair of images obtained with capture devices pointing in opposing directions, as described in detail in U.S. Patent Application Ser. No. 62/134,567, entitled "UNI BODY DUAL-LENS MOUNT FOR A SPHERICAL CAMERA", filed 18 Mar. 2015, incorporated supra.

At operation 1304 a first portion in the first source image and a second portion in the second source image may be identified. In one or more implementations, the first portion and the second portion may correspond to an area of overlap between the respective source images (e.g., the area denoted by arrow 418 in FIG. 4B). In some implementations, the overlap may be represented by a boundary between the two source images (e.g., shown by line 212 in FIG. 2, 412 in FIGS. 4A-4B) and the first and the second portions may be characterized by location of pixels within the first and the second source images, respectively, corresponding to the boundary line.

At operation 1306 a disparity measure may be determined based on an evaluation of pixel values within the first portion and pixel values within the second portion obtained at operation 1304. In one or more implementations, the disparity measure may be determined based on a difference of a pixel value at a location x,y of the source image I1 (e.g., pixel shown by arrow 450 in FIG. 4B) and a pixel value at the location x,y of the source image I2. In some implementations of images comprised of multiple pixel channels (e.g., RGB, CMYK, HSV, and/or other image representations), the disparity measure may be obtained for individual channel. In one or more implementations, the disparity may be determined based on output of Laplacian transformation of source images. By way of a non-limiting illustration, source images (e.g., 1022, 1024 in FIG. 10C) may be convolved with a Laplacian kernel of dimensions 3 pixel by 3 pixel. In some implementations of Laplacian based disparity determination, color correction operation may be omitted.

At operation 1308 a transformation operation may be determined. The transformation operation may be configured to modify value of one or more pixels within the first and/or the second portions of the source images. The transformation operation may be configured based on the disparity measure obtained at operation 1306 using methodology described herein with respect to, e.g., Eqn. 1 through Eqn. 17. In some implementations, the transformation operation may be configured to determine displacement of pixels disposed on a boundary between the source images, the displacement being constrained to a direction tangential to an epipolar line corresponding to the location of the pixel. The pixel value modification may be configured based on the pixel displacement performed in accordance with the transformation. Pixels corresponding to the boundary may be displaced in accordance with the transformation. In some implementations, one or more pixels of the source images disposed outside the boundary may be modified (e.g., displaced) using a spatial smoothing operation and/or temporal smoothing operation.

At operation 1310 pixel match metric may be determined. In some implementations, the metric may comprise squared sum of differences between pixels of one transformed source image and pixels of another transformed source image within the region of overlap between the source images.

At operation 1312 a determination may be made as to whether a target match metric has been reached. In some implementations, the target metric determination may comprise a comparison operation to a threshold value of the pixel match. Responsive to a determination at operation 1312 that the target pixel match has been reached, the method 1300 may proceed to operation 1314 wherein a composite frame may be obtained based on a combination of the transformed source images. In some implementations, the composite frame may comprise frame in equirectangular representation (e.g., as shown in FIG. 10D), rectilinear representation, and/or other coordinate projection representation.

FIG. 14 illustrates a method for pixel alignment along a border region between two images, in accordance with some implementations. Individual images may be obtained using a variety of capture devices, e.g., such as described above with respect to FIG. 13.

At operation 1404 a boundary region of an image obtained with a camera may be determined. In some implementations, the boundary area may correspond to an area of overlap between the image and another image (e.g., the area indicated by area 418 in FIGS. 4A-4B) and/or a border line between the images (e.g., the ISO line 412 in FIGS. 4A-4B, and/or border indicated by arrows 1028 in FIGS. 10C-10D and/or 1138 in FIGS. 11B-11C).

At operation 1406 a transformation operation configured to displace pixels of the boundary region in a direction tangential to epipolar line for the camera may be determined. The epipolar line may be determined using camera configuration (e.g., optical node location 220 in FIG. 2, 420 in FIG. 4A). The transformation may be configured based on a disparity measure between pixels of the image and pixels of another image, e.g., as described with respect to operation 1306 above. Pixel displacement may be constrained in accordance with, e.g., Eqn. 14-Eqn. 17

At operation 1408 the transformation obtained at operation 1406 may be applied to one or more pixels within the boundary region determined at operation 1404. In some implementations, pixel values of the boundary region may be modified in accordance with the transformation. In one or more implementations, pixel locations may be modified in accordance with, e.g., warp transformation shown in FIGS. 5B-5C.

At operation 1410 a spatio-temporal transformation configured to reduce a contrast measure between one or more pixels within the boundary area and at least one pixel outside the boundary area may be applied. In some implementations, the spatial transformation may comprise propagation (e.g., via extrapolation) of the warp displacement along a direction towards a location corresponding to an optical node of the camera (e.g., the location 420 in FIG. 4A). Spatial and/or temporal smoothing transformations may be configured using a Gaussian smoothing kernel. In some implementations, one or more pixels of the source images disposed outside the boundary may be modified (e.g., displaced) using a spatial smoothing operation and/or temporal smoothing operation. Temporal smoothing may be configured based on the temporal smoothing cost function component fts, e.g., as described by Eqn. 8. in some implementations wherein an optimization process may be configured to decrease a cost function, the temporal smoothing cost function may be increased based on a difference in outcome of a given warp solution applied to two successive frames (e.g., greater frame difference may cause greater cost increase). In some implementations, the frame warp solution may be determined for a block of frames selected with or without an overlap. Duration of the block may be selected between 10% and 50% of the total video duration. Temporal cost function may be evaluated for a block of frames transformed using a given warp solution. In one or more implementations, the temporal smoothing cost function may be determined based on two frames from two block of frames (e.g., the first frame of the current block and the last frame of the preceding block). In some implementations wherein memory resources may be sufficient to fit a video clip into processing memory, a single optimization for solution may be obtained for the video clip.

Image transformation methodology (image warp) described herein may enable to obtain matched image at a reduced computational load. When comparing warp transformation of the disclosure configured to determine optimized displacement pixel along image border to other warp transformations of the prior art that may be operable within the overlap area of N pixels in longitudinal dimension (e.g., 404 in FIG. 4A) computational complexity of the warp transformation of the disclosure may be on the order of O(N) while transformations of the prior art may be characterized by computational complexity on the order of $O(N^2)$. By way of an illustration, when processing an image 2000 in width, the methodology of the disclosure may enable a reduction in computational load by about 2000×K operations per image, wherein K denotes a number of operations associated with processing of a single pixel.

Image transformation described herein may utilize disparity in order to determine pixel displacement in x-y space (e.g., using Eqn. 2). When we compare the warp methodology of the disclosure to existing methods that may attempt to directly compute x-displacement wx and y-displacement wy, the methodology of the present disclosure may provide for a factor of 2 decrease in computational load for a given image. These improvements may be traded for a processing device of a reduced complexity and/or cost when processing images with a given resolution. In some implementations, computational complexity reduction that may be obtained using methodology of the disclosure may enable processing images at a greater frame rate and/or increased resolution with a given computational platform, compared to solutions of the prior art.

It will be recognized by those skilled in the arts that while certain aspects of the technology are described for images obtained by a video capture device, methodology described herein may be applicable to other sensor technologies (e.g., sensing infrared, radio frequency waves, xray waves, pressure waves, and/or other types of waves) and/or to other image configurations.

As used herein, the term "bus" is meant generally to denote all types of interconnection or communication architecture that may be used to communicate date between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in a system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLABT™, PASCAL, Python, assembly language, markup languages (e.g., HTML, SGML, XML, VoXML), and the like, as well as object-oriented environments such as the Common Object Request Broker Architecture (CORBA), Java' (including J2ME, Java Beans, etc.), Binary Runtime Environment (e.g., BREW), and the like.

As used herein, the terms "connection", "link", "transmission channel", "delay line", "wireless" means a causal link between any two or more entities (whether physical or logical/virtual), which enables information exchange between the entities.

As used herein, the term "contrast" means the difference in luminance or color of portions of a digital image (e.g., image pixels) that makes one portion distinguishable from another portion.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnee™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the technology. The scope of the disclosure should be determined with reference to the claims.

What is claimed:

1. A computerized system configured to obtain a composite image, the system comprising:
 a capture device configured to obtain source images, the source images including a first source image and a second source image; and
 one or more physical processors configured by machine-readable instructions to:
  identify overlapping portions of the source images, such overlapping portions including a first portion comprised of a first plurality of pixels within the first source image and a second portion comprised of a second plurality of pixels within the second source image;
  obtain a disparity measure for corresponding locations in the first source image and the second source image based on an evaluation of pixels of the first plurality of pixels and pixels of the second plurality of pixels at the corresponding locations;
  apply a transformation operation to at least pixels within the overlapping portions of the source images to generate transformed source images, the transformation operation configured to displace pixels of one or both of the first plurality of pixels and/or the second plurality of pixels to reduce the disparity measure; and
  obtain the composite image by combining the transformed source images.

2. The system of claim 1, wherein the first plurality of pixels and the second plurality of pixels form a boundary between the first source image and the second source image.

3. The system of claim 2, wherein the transformation operation is configured to displace one or more of the pixels of the first plurality of pixels disposed at the boundary by a first displacement along a first direction and one or more of the pixels of the second plurality of pixels disposed at the boundary by the first displacement along a second direction.

4. The system of claim 3, wherein for a given pixel of the one or more of the pixels of the first plurality of pixels and the pixels of the second plurality of pixels disposed at the boundary, the first direction and the second direction are being configured tangential to an epipolar line associated with the given pixel location, the epipolar line configured based on a geometry of a camera used to obtain the first source image.

5. The system of claim 4, wherein the direction is characterized by a first displacement component configured based on a trigonometric cosine operation of the epipolar line and a second displacement component configured based on a trigonometric sine operation of the epipolar line.

6. The system of claim 4, wherein:
the transformation operation comprises an extrapolation operation configured to displace at least one pixel disposed outside the boundary by a second displacement, the second displacement based on the first displacement and a distance between the given pixel and the at least one pixel disposed outside the boundary.

7. The system of claim 6, wherein the second displacement is reduced inversely with the distance.

8. The system of claim 6, wherein the extrapolation operation comprises a spatial smoothing operation.

9. The system of claim 2, wherein:
individual pixels of the first source image and the second source image are characterized by a brightness component and a chromaticity component; and
the processor is further adapted to:
apply a color correction operation configured to reduce difference between chromaticity components of pixels of the first source image at the boundary relative to chromaticity components of pixels of the second source image at the boundary; and
apply an exposure correction operation configured to reduce difference between brightness components of the pixels of the first source image at the boundary relative to brightness components of the pixels of the second source image at the boundary.

10. The system of claim 2, wherein:
the capture device comprises:
a first lens optically coupled to a first image sensor configured to obtain the first source image; and
a second lens optically coupled to a second image sensor configured to obtain the second source image; and
the boundary comprises an iso-line encompassing 180 degree field of view boundary of the first lens, and the first plurality of pixels and the second plurality of pixels form a boundary between the first source image and the second source image.

11. The system of claim 10, wherein:
a first field of view of the first lens is configured to point in a first direction;
a second field of view of the second lens is configured to point in a second direction opposing the first direction.

12. The system of claim 11, wherein:
the first lens and the second lens are characterized by a fish-eye lens pattern with a field of view of at least 180 degrees;
the first source image and the second source image cover at least 180×180 degree field of view; and
the composite image is configured to cover 360×180 degree field of view.

13. The system of claim 12, wherein:
the composite image is configured in an equirectangular plane characterized by latitudinal and longitudinal dimensions;
the boundary is configured at a half point along the latitudinal dimension.

14. The system of claim 1, wherein the transformation operation is configured based on an output of a feature selection operation which:
determines a first smoothed version of the first source image based on a spatial smoothing operation with a first smoothing kernel characterized by a first smoothing scale;
determines a first location of a feature of a transformation cost function for a given disparity based on the first smoothed version of the first source image;
determines a second smoothed version of the first source image based on the spatial smoothing operation with a second smoothing kernel characterized by a second smoothing scale configured greater than the first smoothing scale; and
adjusts the first location based on a disparity using the second smoothed version of the first source image.

15. The system of claim 14, wherein the feature corresponds to a value of disparity such that an absolute value of a second derivative of the transformation cost function is below a given value.

16. The system of claim 14, wherein a cost indicated by the transformation cost function varies as a function of a sum of squared differences between a pixel value of the first source image at a given location in the first source image and a pixel value of the second source image at a location in the second source image that corresponds to the given location in the first source image.

17. The system of claim 2, wherein the transformation operation is configured to reduce a contrast measure within the composite image, the contrast measure being determined based on difference of chromaticity components of pixels of the first source image and pixels of the second source image at the boundary.

18. The system of claim 2, wherein the transformation operation is configured to reduce a contrast measure within the composite image, the contrast measure being determined based on difference of brightness components of pixels of the first source image and pixels of the second source image at the boundary.

19. A capture apparatus, comprising:
a first lens optically coupled to a first image sensor configured to obtain a first source image;
a second lens optically coupled to a second image sensor configured to obtain a second source image;
a processor in operable communication with the first image sensor and the second image sensor;
a non-transitory storage medium configured to store a plurality of computer instructions which when executed by the processor:
identify a boundary region between the first source image and the second source image, the boundary region comprised of first pixels of the first source image and second pixels of the second source image;

obtain a disparity measure based on an evaluation of one or more of the first pixels and one or more of the second pixels disposed at a given location within the boundary region, the given location having an epipolar line associated therewith; and apply a transformation operation configured to displace pixels within the boundary region along a direction configured tangential to the epipolar line for the given location;

wherein the first lens is characterized by a first optical center location and the second lens is characterized by a second optical center location;

the epipolar line comprises a segment configured to connect the first optical center location, the second optical center location, and the given location; and the transformation operation is configured to reduce the disparity measure.

20. The apparatus of claim 19, wherein the first lens and the second lens are characterized by a fish eye field of view; and the plurality of computer instructions when executed by the processor are further configured to convert the first source image and the second source image into an equirectangular plane so that the boundary region is transformed into a straight segment; and the transformation operation is configured to be applied to an output of the conversion of the first source image and the second source image into the equirectangular plane.

\* \* \* \* \*